United States Patent
Fuchs et al.

(10) Patent No.: US 11,937,075 B2
(45) Date of Patent: *Mar. 19, 2024

(54) APPARATUS, METHOD AND COMPUTER PROGRAM FOR ENCODING, DECODING, SCENE PROCESSING AND OTHER PROCEDURES RELATED TO DIRAC BASED SPATIAL AUDIO CODING USING LOW-ORDER, MID-ORDER AND HIGH-ORDER COMPONENTS GENERATORS

(71) Applicant: Fraunhofer-Gesellschaft zur Förderung der angewandten Forschung e.V., Munich (DE)

(72) Inventors: Guillaume Fuchs, Erlangen (DE); Oliver Thiergart, Erlangen (DE); Srikanth Korse, Erlangen (DE); Stefan Döhla, Erlangen (DE); Markus Multrus, Erlangen (DE); Fabian Küch, Erlangen (DE); Alexandre Bouthéon, Erlangen (DE); Andrea Eichenseer, Erlangen (DE); Stefan Bayer, Erlangen (DE)

(73) Assignee: FRAUNHOFER-GESELLSCHAFT ZUR FÖRDERUNG DER ANGEWAND FORSCHUNG E.V, Munich (DE)

( * ) Notice: Subject to any disclaimer, the term of this patent is extended or adjusted under 35 U.S.C. 154(b) by 263 days.

This patent is subject to a terminal disclaimer.

(21) Appl. No.: 17/332,358

(22) Filed: May 27, 2021

(65) Prior Publication Data
US 2021/0289314 A1    Sep. 16, 2021

Related U.S. Application Data

(63) Continuation of application No. PCT/EP2019/084056, filed on Dec. 6, 2019.

(30) Foreign Application Priority Data

Dec. 7, 2018  (EP) .................................... 18211064

(51) Int. Cl.
*H04S 7/00*       (2006.01)
*G10L 19/02*     (2013.01)

(52) U.S. Cl.
CPC .............. *H04S 7/307* (2013.01); *G10L 19/02* (2013.01); *G10L 19/0212* (2013.01);
(Continued)

(58) Field of Classification Search
CPC . G10L 19/008; G10L 19/167; G10L 19/0204; G10L 2021/02166; H04S 2420/01
(Continued)

(56) References Cited

U.S. PATENT DOCUMENTS 7,031,474 B1    4/2006    Yuen et al.
7,974,713 B2    7/2011    Disch et al.
(Continued)

FOREIGN PATENT DOCUMENTS

CN          1254153 C      4/2006
CN        102422348 A      4/2012
(Continued)

OTHER PUBLICATIONS

Russian language office action dated Oct. 20, 2021, issued in application No. RU 2021118694.
(Continued)

*Primary Examiner* — Alexander Krzystan
(74) *Attorney, Agent, or Firm* — McClure, Qualey & Rodack, LLP

(57) ABSTRACT

An apparatus for generating a sound field description using an input signal having a mono-signal or a multi-channel signal comprises: an input signal analyzer for analyzing the
(Continued)

input signal to derive direction data and diffuseness data; a low-order components generator for generating a low-order sound field description from the input signal up to a predetermined order and mode; a mid-order components generator for generating a mid-order sound field description above the predetermined order or at the predetermined order and above the predetermined mode and below or at a first truncation order using a synthesis of at least one direct portion and of at least one diffuse portion using the direction data and the diffuseness data; and a high-order components generator for generating a high-order sound field description having a component above the first truncation order using a synthesis of at least one direct portion.

18 Claims, 12 Drawing Sheets

(52) U.S. Cl.
CPC ....... *H04S 2400/01* (2013.01); *H04S 2420/11* (2013.01); *H04S 2420/13* (2013.01)

(58) Field of Classification Search
USPC .............................. 381/22, 23, 310; 700/94
See application file for complete search history.

(56) References Cited

U.S. PATENT DOCUMENTS

| | | | |
|---|---|---|---|
| 8,346,565 | B2 | 1/2013 | Uhle et al. |
| 8,452,019 | B1 | 5/2013 | Fomin et al. |
| 8,811,621 | B2 | 8/2014 | Schuijers |
| 8,891,797 | B2 | 11/2014 | Thiergart et al. |
| 9,691,406 | B2 | 6/2017 | Jax et al. |
| 9,743,215 | B2 | 8/2017 | Uhle et al. |
| 9,838,821 | B2* | 12/2017 | Kelloniemi ............... H04S 7/30 |
| 9,930,464 | B2 | 3/2018 | Kordon et al. |
| 9,973,874 | B2 | 5/2018 | Stein et al. |
| 10,136,239 | B1 | 11/2018 | Stefanakis et al. |
| 11,272,305 | B2* | 3/2022 | Habets .................... H04S 3/008 |
| 2008/0298597 | A1 | 12/2008 | Turku et al. |
| 2009/0161880 | A1 | 6/2009 | Hooley et al. |
| 2011/0106545 | A1 | 5/2011 | Disch et al. |
| 2012/0114126 | A1 | 5/2012 | Thiergart et al. |
| 2012/0155653 | A1 | 6/2012 | Jax et al. |
| 2012/0177204 | A1 | 7/2012 | Hellmuth et al. |
| 2013/0259243 | A1 | 10/2013 | Herre et al. |
| 2014/0016802 | A1 | 1/2014 | Sen |
| 2015/0154965 | A1 | 6/2015 | Wuebbolt et al. |
| 2015/0189436 | A1 | 7/2015 | Kelloniemi |
| 2015/0221313 | A1 | 8/2015 | Purnhagen et al. |
| 2015/0248889 | A1 | 9/2015 | Dickins et al. |
| 2015/0271621 | A1 | 9/2015 | Sen et al. |
| 2016/0057556 | A1 | 2/2016 | Boehm |
| 2016/0064005 | A1 | 3/2016 | Peters et al. |
| 2016/0227337 | A1 | 8/2016 | Goodwin |
| 2017/0032799 | A1 | 2/2017 | Peters et al. |
| 2017/0078818 | A1 | 3/2017 | Habets et al. |
| 2017/0078819 | A1 | 3/2017 | Habets et al. |
| 2017/0180902 | A1 | 6/2017 | Kordon et al. |
| 2017/0366914 | A1 | 12/2017 | Stein |
| 2018/0156598 | A1 | 6/2018 | Cable et al. |
| 2018/0192226 | A1 | 7/2018 | Woelfl |
| 2018/0218740 | A1 | 8/2018 | Kleijn et al. |
| 2018/0234785 | A1 | 8/2018 | Kordon et al. |
| 2018/0315432 | A1 | 11/2018 | Boehm et al. |
| 2018/0333103 | A1 | 11/2018 | Bardan et al. |
| 2020/0154229 | A1* | 5/2020 | Habets .................... H04S 7/304 |
| 2020/0211521 | A1* | 7/2020 | Voss ......................... H04R 7/04 |
| 2020/0221230 | A1* | 7/2020 | Fuchs .................... G10L 19/008 |
| 2021/0051435 | A1 | 2/2021 | Yen et al. |
| 2021/0295855 | A1* | 9/2021 | Vasilache ............. G10L 19/0204 |
| 2021/0319799 | A1* | 10/2021 | Pihlajakuja ......... G10L 19/0204 |

FOREIGN PATENT DOCUMENTS

| | | |
|---|---|---|
| CN | 102547549 A | 7/2012 |
| CN | 103583054 A | 2/2014 |
| CN | 104429102 A | 3/2015 |
| CN | 104471641 A | 3/2015 |
| CN | 105340008 A | 2/2016 |
| CN | 105917407 A | 8/2016 |
| CN | 106664485 A | 5/2017 |
| CN | 106664501 A | 5/2017 |
| DE | 10 2008 004 674 A1 | 6/2009 |
| EP | 1 527 655 B1 | 10/2006 |
| EP | 2 510 709 A1 | 10/2012 |
| EP | 2 942 982 A1 | 11/2015 |
| KR | 10-2015-0134336 A | 12/2015 |
| KR | 10-2017-0007749 A | 1/2017 |
| RU | 2 388 068 C | 4/2010 |
| RU | 2 388 068 C2 | 4/2010 |
| RU | 2 497 204 C2 | 10/2013 |
| RU | 2 558 612 C2 | 8/2015 |
| RU | 2 637 990 C1 | 12/2017 |
| RU | 2 663 345 C2 | 8/2018 |
| TW | I332192 A | 12/2007 |
| TW | I352971 A | 9/2008 |
| TW | I313857 B | 8/2009 |
| TW | 201810249 A | 3/2018 |
| TW | M564300 U | 7/2018 |
| WO | 2009/077152 A1 | 6/2009 |
| WO | 2011/069205 A1 | 6/2011 |
| WO | 2013/141768 A1 | 9/2013 |
| WO | 2014/013070 A1 | 1/2014 |
| WO | 2014/194116 A1 | 12/2014 |
| WO | 2015/116666 A1 | 8/2015 |
| WO | 2015/175933 A1 | 11/2015 |
| WO | 2015/175998 A1 | 11/2015 |
| WO | 2017/157803 A1 | 9/2017 |

OTHER PUBLICATIONS

English language translation of office action dated Oct. 20, 2021, issued in application No. RU 2021118694.
Non-Final Office Action dated May 22, 2023, issued in U.S. Appl. No. 17/332,340.
Russian language office action dated Mar. 25, 2022, issued in application No. RU 2021118691.
English language translation of Russian language office action dated Mar. 25, 2022, issued in application No. RU 2021118691.
Chinese language office action dated Apr. 27, 2023, issued in application No. CN 201980091619.9.
English language translation of office action dated Apr. 27, 2023 (pp. 8-17 of attachment).
Wang, X., et al.; "Reverberation suppression method based on diffuse information in a room sound field;" J. Tsinghua University; Jun. 2013; pp. 1-4.
English language translation of abstract of "Reverberation suppression method based on diffuse information in a room sound field" (p. 1 of attachment).
Wang, Y., et al.; "Low Frequency Sound Field Reproduction within a Cylindrical Cavity Using Higher Order Ambisonics;" Journal of Northwestern Polytechnical University; Aug. 2018; pp. 1-7.
English language translation of abstract of "Low Frequency Sound Field Reproduction within a Cylindrical Cavity Using Higher Order Ambisonics" (p. 7 of attachment).
International Search Report and Written Opinion dated Jan. 29, 2020, issued in application No. PCT/EP2019/084056.
Pulkki, V., et al.; "Directional audio coding—perception-based reproduction of spatial sound;" International Workshop on the Principles and Application on Spatial Hearing; Nov. 2009; pp. 1-4.
Pulkki, V.; "Spatial Sound Reproduction with Directional Audio Coding;" Journal of the Audio Engineering Society, Audio Engineering Society; vol. 55; No. 6; Jun. 2007; pp. 503-516.
Laitinen, M.V., et al.; "Converting 5.1 audio recordings to B-format for direction-al audio coding reproduction;" 2011 IEEE International Conference on Acoustics, Speech and Signal Processing (ICASSP); 2011; pp. 61-64.

(56) References Cited

OTHER PUBLICATIONS

Furness, R.K.; "Ambisonics—An overview;" AES 8th International Conference; Apr. 1990; pp. 181-189.
Nachbar, C., et al.; "AMBIX—A Suggested Ambisonics Format;" Proceedings of the Ambisonics Symposium; 2011; pp. 1-12.
Russian language office action dated Feb. 25, 2022, issued in application No. RU 2021118698.
English language translation of office action dated Feb. 25, 2022, issued in application No. RU 2021118698 (pp. 1-3 of attachment).
Russian language search report dated Feb. 25, 2022, issued in application No. RU 2021118698.
English language translation of search report dated Feb. 25, 2022, issued in application No. RU 2021118698 (pp. 1-2 of attachment).
Chinese language office action dated Apr. 21, 2023, issued in application No. CN 201980091649.X.
Zhou, L.S., et al.; "2.5D Near-Field Sound Source Synthesis Using Higher Order Ambisonics;" China Academic Journal; vol. 45; No. 3; Mar. 2017; pp. 520-526.
English language abstract of "2.5D Near-Field Sound Source Synthesis Using Higher Order Ambisonics;" (p. 520 of publication).
Kallinger, M, et al.; "Enhanced Direction estimation using microphone arrays for directional audio coding;" IEEE; 2008; pp. 45-48.
Chinese language office action dated Apr. 21, 2023, issued in application No. CN 201980091648.5.
Zhu, T., et al.; "Evaluation of Ambisonics Reproduction System with Object Metric Based on Interaural Time Difference;" Journal of Nanjing University; vol. 53; No. 6; Nov. 2017; pp. 1153-1160.
Korean language Notice of Allowance dated Jul. 27, 2023, issued in application No. KR 10-2021-7020826.
Notice of Allowance dated Sep. 6, 2023, issued in U.S. Appl. No. 17/332,312.
Notice of Allowance dated Sep. 7, 2023, issued in U.S. Appl. No. 17/332,340.
Chinese language Notice of Allowance dated Nov. 10, 2023, issued in application No. Cn 201980091649.X.
English language translation of Notice of Allowance dated Nov. 10, 2023 (pp. 1-3 of attachment).
Rui, J.; "Conversion between Stereo and Multichannel Surround;" Xidian University; Dec. 2014; pp. 1-67.
English language translation of "Conversion between Stereo and Multichannel Surround" (p. 6 of publication).

* cited by examiner

APPARATUS, METHOD AND COMPUTER PROGRAM FOR ENCODING, DECODING, SCENE PROCESSING AND OTHER PROCEDURES RELATED TO DIRAC BASED SPATIAL AUDIO CODING USING LOW-ORDER, MID-ORDER AND HIGH-ORDER COMPONENTS GENERATORS

CROSS-REFERENCE TO RELATED APPLICATIONS

This application is a continuation of copending International Application No. PCT/EP2019/084056, filed Dec. 6, 2019, which is incorporated herein by reference in its entirety, and additionally claims priority from European Application No. EP 18211064.3, filed Dec. 7, 2018, which is also incorporated herein by reference in its entirety.

The present invention is directed to audio coding and, particularly, to the generation of a sound field description from an input signal using one or more sound component generators.

BACKGROUND OF THE INVENTION

The Directional Audio Coding (DirAC) technique [1] is an efficient approach to the analysis and reproduction of spatial sound. DirAC uses a perceptually motivated representation of the sound field based on direction of arrival (DOA) and diffuseness measured per frequency band. It is built upon the assumption that at one time instant and at one critical band, the spatial resolution of auditory system is limited to decoding one cue for direction and another for inter-aural coherence. The spatial sound is then represented in frequency domain by cross-fading two streams: a non-directional diffuse stream and a directional non-diffuse stream.

DirAC was originally intended for recorded B-format sound but can also be extended for microphone signals matching a specific loudspeaker setup like 5.1 [2] or any configuration of microphone arrays [5]. In the latest case, more flexibility can be achieved by recording the signals not for a specific loudspeaker setup, but instead recording the signals of an intermediate format.

Such an intermediate format, which is well-established in practice, is represented by (higher-order) Ambisonics [3]. From an Ambisonics signal, one can generate the signals of every desired loudspeaker setup including binaural signals for headphone reproduction. This involves a specific renderer which is applied to the Ambisonics signal, using either a linear Ambisonics renderer [3] or a parametric renderer such as Directional Audio Coding (DirAC).

An Ambisonics signal can be represented as a multi-channel signal where each channel (referred to as Ambisonics component) is equivalent to the coefficient of a so-called spatial basis function. With a weighted sum of these spatial basis functions (with the weights corresponding to the coefficients) one can recreate the original sound field in the recording location [3]. Therefore, the spatial basis function coefficients (i.e., the Ambisonics components) represent a compact description of the sound field in the recording location. There exist different types of spatial basis functions, for example spherical harmonics (SHs) [3] or cylindrical harmonics (CHs) [3]. CHs can be used when describing the sound field in the 2D space (for example for 2D sound reproduction) whereas SHs can be used to describe the sound field in the 2D and 3D space (for example for 2D and 3D sound reproduction).

As an example, an audio signal f(t) which arrives from a certain direction ($\varphi$, $\theta$) results in a spatial audio signal f($\varphi$, $\theta$, t) which can be represented in Ambisonics format by expanding the spherical harmonics up to a truncation order H:

$$f(\varphi, \theta, t) = \sum_{l=0}^{H} \sum_{m=-l}^{+l} Y_l^m(\varphi, \theta)\phi_{lm}(t)$$

whereby $Y_l^m(\varphi, \theta)$ being the spherical harmonics of order l and mode m, and $\phi_{lm}(t)$ the expansion coefficients. With increasing truncation order H the expansion results in a more precise spatial representation. Spherical harmonics up to order H=4 with Ambisonics Channel Numbering (ACN) index are illustrated in FIG. 1a for order n and mode m.

DirAC was already extended for delivering higher-order Ambisonics signals from a first order Ambisonics signal (FOA as called B-format) or from different microphone arrays [5]. This document focuses on a more efficient way to synthesize higher-order Ambisonics signals from DirAC parameters and a reference signal. In this document, the reference signal, also referred to as the down-mix signal, is considered a subset of a higher-order Ambisonics signal or a linear combination of a subset of the Ambisonics components.

In addition, the present invention considers the case in which the DirAC is used for the transmission in parametric form of the audio scene. In this case, the down-mix signal is encoded by a conventional audio core encoder while the DirAC parameters are transmitted in a compressed manner as side information. The advantage of the present method is to takes into account quantization error occurring during the audio coding.

In the following, an overview of a spatial audio coding system based on DirAC designed for Immersive Voice and Audio Services (IVAS) is presented. This represents one of different contexts such as a system overview of a DirAC Spatial Audio Coder. The objective of such a system is to be able to handle different spatial audio formats representing the audio scene and to code them at low bit-rates and to reproduce the original audio scene as faithfully as possible after transmission.

The system can accept as input different representations of audio scenes. The input audio scene can be captured by multi-channel signals aimed to be reproduced at the different loudspeaker positions, auditory objects along with metadata describing the positions of the objects over time, or a first-order or higher-order Ambisonics format representing the sound field at the listener or reference position.

The system is based on 3GPP Enhanced Voice Services (EVS) since the solution is expected to operate with low latency to enable conversational services on mobile networks.

As shown in FIG. 1b, the encoder (IVAS encoder) is capable of supporting different audio formats presented to the system separately or at the same time. Audio signals can be acoustic in nature, picked up by microphones, or electrical in nature, which are supposed to be transmitted to the loudspeakers. Supported audio formats can be multi-channel signal, first-order and higher-order Ambisonics components, and audio objects. A complex audio scene can also be described by combining different input formats. All audio formats are then transmitted to the DirAC analysis, which extracts a parametric representation of the complete audio scene. A direction of arrival and a diffuseness measured per time-frequency unit form the parameters. The DirAC analysis is followed by a spatial metadata encoder, which quantizes and encodes DirAC parameters to obtain a low bit-rate parametric representation.

Along with the parameters, a down-mix signal derived from the different sources or audio input signals is coded for transmission by a conventional audio core-coder. In this case an EVS-based audio coder is adopted for coding the down-mix signal. The down-mix signal consists of different channels, called transport channels: the signal can be e.g. the four coefficient signals composing a B-format signal, a stereo pair or a monophonic down-mix depending of the targeted bit-rate. The coded spatial parameters and the coded audio bitstream are multiplexed before being transmitted over the communication channel.

The encoder side of the DirAC-based spatial audio coding supporting different audio formats is illustrated in FIG. 1b. An acoustic/electrical input 1000 is input into an encoder interface 1010, where the encoder interface has a specific functionality for first-order Ambisonics (FOA) or high order Ambisonics (HOA) illustrated in 1013. Furthermore, the encoder interface has a functionality for multichannel (MC) data such as stereo data, 5.1 data or data having more than two or five channels. Furthermore, the encoder interface 1010 has a functionality for object coding as, for example, SAOC (spatial audio object coding) illustrated 1011. The IVAS encoder comprises a DirAC stage 1020 having a DirAC analysis block 1021 and a downmix (DMX) block 1022. The signal output by block 1022 is encoded by an IVAS core encoder 1040 such as AAC or EVS encoder, and the metadata generated by block 1021 is encoded using a DirAC metadata encoder 1030.

In the decoder, shown in FIG. 2, the transport channels are decoded by the core-decoder, while the DirAC metadata is first decoded before being conveyed with the decoded transport channels to the DirAC synthesis. At this stage, different options can be considered. It can be requested to play the audio scene directly on any loudspeaker or headphone configurations as is usually possible in a conventional DirAC system (MC in FIG. 2).

The decoder can also deliver the individual objects as they were presented at the encoder side (Objects in FIG. 2).

Alternatively, it can also be requested to render the scene to Ambisonics format for other further manipulations, such as rotation, reflection or movement of the scene (FOA/HOA in FIG. 2) or for using an external renderer not defined in the original system.

The decoder of the DirAC-spatial audio coding delivering different audio formats is illustrated in FIG. 2 and comprises an IVAS decoder 1045 and the subsequently connected decoder interface 1046. The IVAS decoder 1045 comprises an IVAS core-decoder 1060 that is configured in order to perform a decoding operation of content encoded by IVAS core encoder 1040 of FIG. 1b. Furthermore, a DirAC metadata decoder 1050 is provided that delivers the decoding functionality for decoding content encoded by the DirAC metadata encoder 1030. A DirAC synthesizer 1070 receives data from block 1050 and 1060 and using some user interactivity or not, the output is input into a decoder interface 1046 that generates FOA/HOA data illustrated at 1083, multichannel data (MC data) as illustrated in block 1082, or object data as illustrated in block 1080.

A conventional HOA synthesis using DirAC paradigm is depicted in FIG. 3. An input signal called down-mix signal is time-frequency analyzed by a frequency filter bank. The frequency filter bank 2000 can be a complex-valued filterbank like Complex-valued QMF or a block transform like STFT. The HOA synthesis generates at the output an Ambisonics signal of order H containing $(H+1)^2$ components. Optionally it can also output the Ambisonics signal rendered on a specific loudspeaker layout. In the following, we will detail how to obtain the $(H+1)^2$ components from the down-mix signal accompanied in some cases by input spatial parameters.

The down-mix signal can be the original microphone signals or a mixture of the original signals depicting the original audio scene. For example if the audio scene is captured by a sound field microphone, the down-mix signal can be the omnidirectional component of the scene (W), a stereo down-mix (L/R), or the first order Ambisonics signal (FOA).

For each time-frequency tile, a sound direction, also called Direction-of-Arrival (DOA), and a diffuseness factor are estimated by the direction estimator 2020 and by the diffuseness estimator 2010, respectively, if the down-mix signal contains sufficient information for determining such DirAC parameters. It is the case, for example, if the down-mix signal is a First Oder Ambisonics signal (FOA). Alternatively or if the down-mix signal is not sufficient to determine such parameters, the parameters can be conveyed directly to the DirAC synthesis via an input bit-stream containing the spatial parameters. The bit-stream could consists for example of quantized and coded parameters received as side-information in the case of audio transmission applications. In this case, the parameters are derived outside the DirAC synthesis module from the original microphone signals or the input audio formats given to the DirAC analysis module at the encoder side as illustrated by switch 2030 or 2040.

The sound directions are used by a directional gains evaluator 2050 for evaluating, for each time-frequency tile of the plurality of time-frequency tiles, one or more set of $(H+1)^2$ directional gains $G_l^m(k, n)$, where H is the order of the synthesized Ambisonics signal.

The directional gains can be obtained by evaluation the spatial basis function for each estimated sound direction at the desired order (level) l and mode m of the Ambisonics signal to synthesize. The sound direction can be expressed for example in terms of a unit-norm vector n(k, n) or in terms of an azimuth angle $\varphi(k, n)$ and/or elevation angle $\theta(k, n)$, which are related for example as:

$$n(k, n) = \begin{bmatrix} \cos\varphi(k, n)\cos\theta(k, n) \\ \sin\varphi(k, n)\cos\theta(k, n) \\ \sin\theta(k, n) \end{bmatrix}$$

After estimating or obtaining the sound direction, a response of a spatial basis function of the desired order (level) l and mode m can be determined, for example, by considering real-valued spherical harmonics with SN3D normalization as spatial basis function:

$$Y_l^m(\varphi, \theta) = N_l^{|m|} P_l^{|m|} \sin\theta \begin{cases} \sin(|m|\varphi) & \text{if } m < 0 \\ \cos(|m|\varphi) & \text{if } m \geq 0 \end{cases}$$

with the ranges $0 \leq l \leq H$, and $-l \leq m \leq l$. $P_l^{|m|}$ are the Legendre-functions and $N_l^{|m|}$ is a normalization term for both the Legendre functions and the trigonometric functions which takes the following form for SN3D:

$$N_l^{|m|} = \sqrt{\frac{2-\delta_m}{4\pi} \frac{(l-|m|)!}{(l+|m|)!}}$$

where the Kronecker-delta $\delta_m$ is one for m=0 and zero otherwise. The directional gains are then directly deduced for each time-frequency tile of indices (k, n) as:

$$G_l^m(k,n) = Y_l^m(\varphi(k,n), \theta(k,n))$$

The direct sound Ambisonics components $P_{s,l}^m$ are computed by deriving a reference signal $P_{ref}$ from the down-mix signal and multiplied by the directional gains and a factor function of the diffuseness $\Psi(k, n)$:

$$P_{s,l}^m(k,n) = P_{ref}(k,n)\sqrt{1-\Psi(k,n)} G_l^m(k,n)$$

For example, the reference signal $P_{ref}$ can be the omnidirectional component of the down-mix signal or a linear combination of the K channels of the down-mix signal.

The diffuse sound Ambisonics component can be modelled by using a response of a spatial basis function for sounds arriving from all possible directions. One example is to define the average response $D_l^m$ by considering the integral of the squared magnitude of the spatial basis function $Y_l^m(\varphi, \theta)$ over all possible angles $\varphi$ and $\theta$:

$$D_l^m = \int_0^{2\pi} \int_0^{\pi} |Y_l^m(\varphi, \theta)|^2 \sin\theta d\theta d\varphi$$

The diffuse sound Ambisonics components $P_{d,l}^m$ are computed from a signal $P_{diff}$ multiplied by the average response and a factor function of the diffuseness $\Psi(k, n)$:

$$P_{d,l}^m(k,n) = P_{diff,l}^m(k,n)\sqrt{\Psi(k,n)}\sqrt{D_l^m}$$

The signal $P_{diff,l}^m$ can be obtained by using different decorrelators applied to the reference signal $P_{ref}$.

Finally, the direct sound Ambisonics component and the diffuse sound Ambisonics component are combined 2060, for example, via the summation operation, to obtain the final Ambisonics component $P_l^m$ of the desired order (level) l and mode m for the time-frequency tile (k, n), i.e., $$P_l^m(k,n) = P_{s,l}^m(k,n) + P_{diff,l}^m(k,n)$$

The obtained Ambisonics components may be transformed back into the time domain using an inverse filter bank 2080 or an inverse STFT, stored, transmitted, or used for example for spatial sound reproduction applications. Alternatively, a linear Ambisonics renderer 2070 can be applied for each frequency band for obtaining signals to be played on a specific loudspeaker layout or over headphone before transforming the loudspeakers signals or the binaural signals to the time domain.

It should be noted that [5] also taught the possibility that diffuse sound components $P_{diff,l}^m$ could only be synthesized up to an order L, where L<H. This reduces the computational complexity while avoiding synthetic artifacts due to the intensive use of decorrelators.

SUMMARY

According to an embodiment, an apparatus for generating a sound field description using an input signal including a mono-signal or a multi-channel signal may have: an input signal analyzer for analyzing the input signal to derive direction data and diffuseness data; a low-order components generator for generating a low-order sound field description from the input signal up to a predetermined order and mode, wherein the low-order components generator is configured to derive the low-order sound field description by copying or taking the input signal or performing a weighted combination of the channels of the input signal; a mid-order components generator for generating a mid-order sound field description above the predetermined order or at the predetermined order and above the predetermined mode and below or at a first truncation order using a synthesis of at least one direct portion and of at least one diffuse portion using the direction data and the diffuseness data so that the mid-order sound field description includes a direct contribution and a diffuse contribution; and a high-order components generator for generating a high-order sound field description having a component above the first truncation order using a synthesis of at least one direct portion, wherein the high order sound field description includes a direct contribution only.

According to another embodiment, a method for generating a sound field description using an input signal including a mono-signal or a multi-channel signal may have the steps of: analyzing the input signal to derive direction data and diffuseness data; generating a low order sound field description from the input signal up to a predetermined order and mode, wherein the low order generator is configured to derive the low order sound field description by copying the input signal or performing a weighted combination of the channels of the input signal; generating a mid-order sound field description above the predetermined order or at the predetermined order and above the predetermined mode and below a high order using a synthesis of at least one direct portion and of at least one diffuse portion using the direction data and the diffuseness data so that the mid-order sound field description includes a direct contribution and a diffuse contribution; and generating a high order sound field description having a component at or above the high order using a synthesis of at least one direct portion without any diffuse component synthesis so that the high order sound field description includes a direct contribution only.

Another embodiment may have a non-transitory digital storage medium having a computer program stored thereon to perform the inventive method when said computer program is run by a computer.

The present invention in accordance with a first aspect is based on the finding that it is not needed to perform a sound field component synthesis including a diffuse portion calculation for all generated components. It is sufficient to perform a diffuse component synthesis only up to a certain order. Nevertheless, in order to not have any energy fluctuations or energy errors, an energy compensation is performed when generating the sound field components of a first group of sound field components that have a diffuse and a direct component, where this energy compensation depends on the diffuseness data, and at least one of a number of sound field components in the second group, a maximum order of sound field components of the first group and a maximum order of the sound field components of the second group. Particularly, in accordance with the first aspect of the present invention, an apparatus for generating a sound field description from an input signal comprising on or more channels comprises an input signal analyzer for obtaining diffuseness data from the input signal and a sound component generator for generating, from the input signal, one or more sound field components of a first group of sound field components having for each sound field component a direct component and a diffuse component, and for generating, from the input signal, the second group of sound field components having only the direct component. Particularly, the sound component generator performs an energy compensation when generating the first group of sound field components, the energy compensation depending on the diffuseness data and at least one of a number of sound field components in the second group, a number of diffuse components in the first group, a maximum order of sound field components of the first group, and a maximum order of sound field components of the second group.

The first group of sound field components may comprise low order sound field components and mid-order sound field components, and the second group comprises high order sound field components.

An apparatus for generating a sound field description from an input signal comprising at least two channels in accordance with a second aspect of the invention comprises an input signal analyzer for obtaining direction data and diffuseness data from the input signal. The apparatus furthermore comprises an estimator for estimating a first energy- or amplitude-related measure for an omni-directional component derived from the input signal and for estimating a second energy- or amplitude-related measure for a directional component derived from the input signal. Furthermore, the apparatus comprises a sound component generator for generating sound field components of the sound field, where the sound component generator is configured to perform an energy compensation of the directional component using the first energy- or amplitude-related measure, the second energy- or amplitude-related measure, the direction data and the diffuseness data.

Particularly, the second aspect of the present invention is based on the finding that in a situation, where a directional component is received by the apparatus for generating a sound field description and, at the same time, direction data and diffuseness data are received as well, the direction and diffuseness data can be utilized for compensating for any errors probably introduced due to a quantization or any other processing of the directional or omni-directional component within the encoder. Thus, the direction and diffuseness data are not simply applied for the purpose of sound field description generation as they are, but this data is utilized a "second time" for correcting the directional component in order to undo or at least partly undo and, therefore, compensate for an energy loss of the directional component.

This energy compensation is performed to low order components that are received at a decoder interface or that are generated from a data received from an audio encoder generating the input signal.

In accordance with a third aspect of the present invention, an apparatus for generating a sound field description using an input signal comprising a mono-signal or a multi-channel signal comprises an input signal analyzer, a low-audio component generator, a mid-order component generator, and a high-order components generator.

Particularly, the different "sub"-generators are configured for generating sound field components in the respective order based on a specific processing procedure that is different for each of the low, mid or high-order components generator. This makes sure that an optimum trade-off between processing requirements on the one hand, audio quality requirements on the other hand and practicality procedures on the again other hand are maintained. By means of this procedure, the usage of decorrelators, for example, is restricted only to the mid-order components generation but any artifacts-prone decorrelators are avoided for the low-order components generation and the high-order components generation. On the other hand, an energy compensation is performed for the loss of diffuse components energy and this energy compensation is performed within the low-order sound field components only or within the mid-order sound field components only or in both the low-order sound field components and the mid-order sound field components. An energy compensation for the directional component formed in the low-order components generator is also done using transmitted directional diffuseness data.

Embodiments relate to an apparatus, a method or a computer program for synthesizing of a (Higher-order) Ambisonics signal using a Directional Audio Coding paradigm (DirAC), a perceptually-motivated technique for spatial audio processing.

Embodiments relate to an efficient method for synthesizing an Ambisonics representation of an audio scene from spatial parameters and a down-mix signal. In an application of the method, but not limited to, the audio scene is transmitted and therefore coded for reducing the amount of transmitted data. The down-mix signal is then strongly constrained in number of channels and quality by the bit-rate available for the transmission. Embodiments relate to an effective way to exploit the information contained in the transmitted down-mix signal to reduce complexity of the synthesis while increasing quality.

Another embodiment of the invention concerns the diffuse component of the sound field which can be limited to be only modelled up to a predetermined order of the synthesized components for avoiding synthesizing artefacts. The embodiment provides a way to compensate for the resulting loss of energy by amplifying the down-mix signal.

Another embodiment concerns the directional component of the sound field whose characteristics can be altered within the down-mix signal. The down-mix signal can be further energy normalized to preserve the energy relationship dictated by a transmitted direction parameter but broken during the transmission by injected quantization or other errors.

BRIEF DESCRIPTION OF THE DRAWINGS

Embodiments of the present invention will be detailed subsequently referring to the appended drawings, in which.

DETAILED DESCRIPTION OF THE INVENTION

Figure 6:
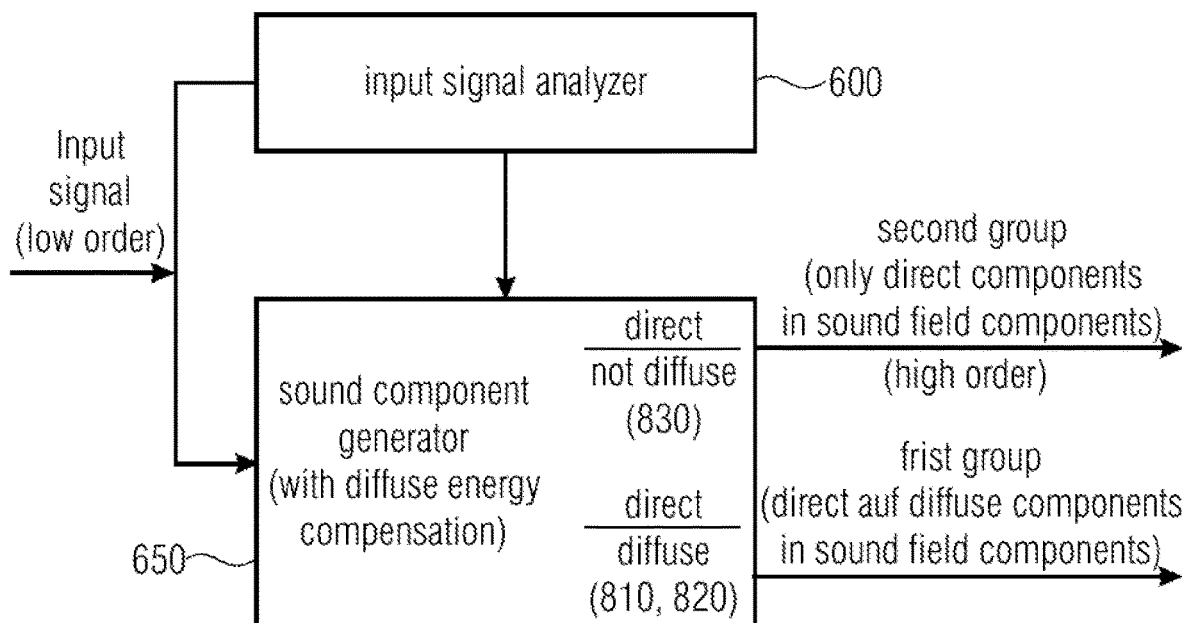
FIG. 6 illustrates an apparatus for generating a sound field description in accordance with a first aspect of the present invention.

FIG. 6 illustrates an apparatus for generating a sound field description in accordance with the first aspect of the invention. The apparatus comprises an input signal analyzer 600 for obtaining diffuseness data from the input signal illustrated at the left in FIG. 6. Furthermore, the apparatus comprises a sound component generator 650 for generating, from the input signal, one or more sound field components of a first group of sound field components having for each sound field component a direct component and a diffuse component. Furthermore, the sound component generator generates, from the input signal, a second group of sound field components having only a direct component.

Particularly, the sound component generator 650 is configured to perform an energy compensation when generating the first group of sound field components. The energy compensation depends on the diffuseness data and the number of sound field components in the second group or on a maximum order of the sound field components of the first group or a maximum order of the sound field components of the second group. Particularly, in accordance with the first aspect of the invention, an energy compensation is performed to compensate for an energy loss due to the fact that, for the second group of sound field components, only direct components are generated and any diffuse components are not generated.

Contrary thereto, in the first group of sound field components, the direct and the diffuse portions are included in the sound field components. Thus, the sound component generator 650 generates, as illustrated by the upper array, sound field components that only have a direct part and not a diffuse part as illustrated, in other figures, by reference number 830 and the sound component generator generates sound field components that have a direct portion and a diffuse portion as illustrated by reference numbers 810, 820 that are explained later on with respect to other figures.

Figure 7:
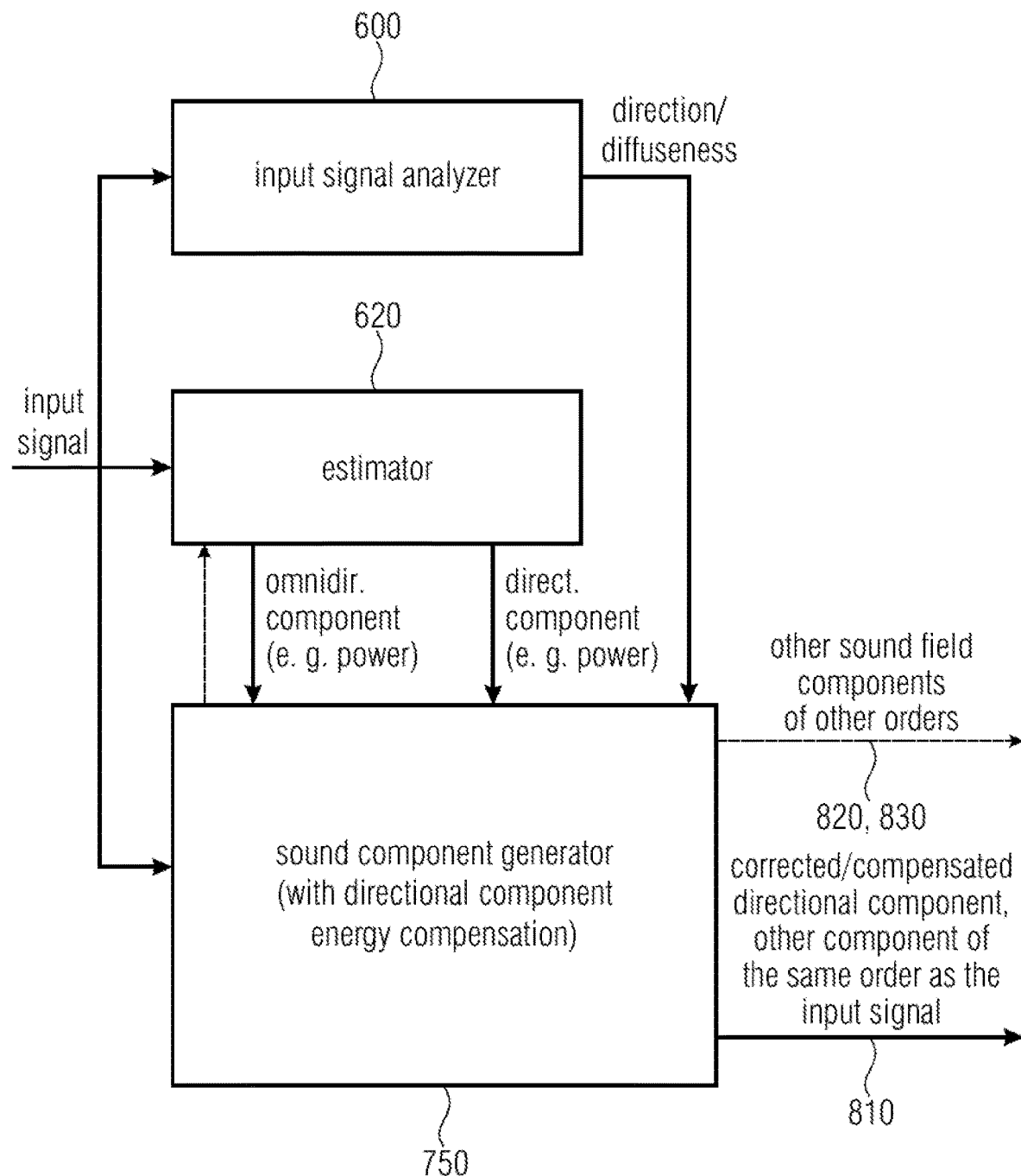
FIG. 7 illustrates an apparatus for generating a sound field description in accordance with a second aspect of the present invention.

FIG. 7 illustrates an apparatus for generating a sound field description from an input signal comprising at least two channels in accordance with the second aspect of the invention. The apparatus comprises an input signal analyzer 600 for obtaining direction data and diffuseness data from the input signal. Furthermore, an estimator 720 is provided for estimating a first energy- or amplitude-related measure for an omnidirectional component derived from the input signal and for estimating a second energy- or amplitude-related measure for a directional component derived from the input signal.

Furthermore, the apparatus for generating the sound field description comprises a sound component generator 750 for generating sound field components of the sound field, where the sound component generator 750 is configured to perform an energy compensation of the directional component using the first amplitude-measure, the second energy- or amplitude-related measure, the direction data and the diffuseness data. Thus, the sound component generator generates, in accordance with the second aspect of the present invention, corrected/compensated directional (direct) components and, if correspondingly implemented, other components of the same order as the input signal such as omnidirectional components that are not energy-compensated or are only energy compensated for the purpose of diffuse energy compensation as discussed in the context of FIG. 6. It is to be noted that the amplitude-related measure may also be the norm or magnitude or absolute value of the directional or omnidirectional component such as $B_0$ and $B_1$. The power or energy derived by the power of 2 is advantageous as outlined in the equation, but other powers applied to the norm or magnitude or absolute value can be used as well to obtain the energy- or amplitude-related measure.

In an implementation, the apparatus for generating a sound field description in accordance with the second aspect performs an energy compensation of the directional signal component included in the input signal comprising at least two channels so that a directional component is included in the input signal or can be calculated from the input signal such as by calculating a difference between the two channels. This apparatus can only perform a correction without generating any higher order data or so. However, in other embodiments, the sound component generator is configured to also generate other sound field components from other orders as illustrated by reference numbers 820, 830 described later on, but for these (or higher order) sound components, for which no counterparts were included in the input signal, any directional component energy compensation is not necessarily performed.

Figure 8:
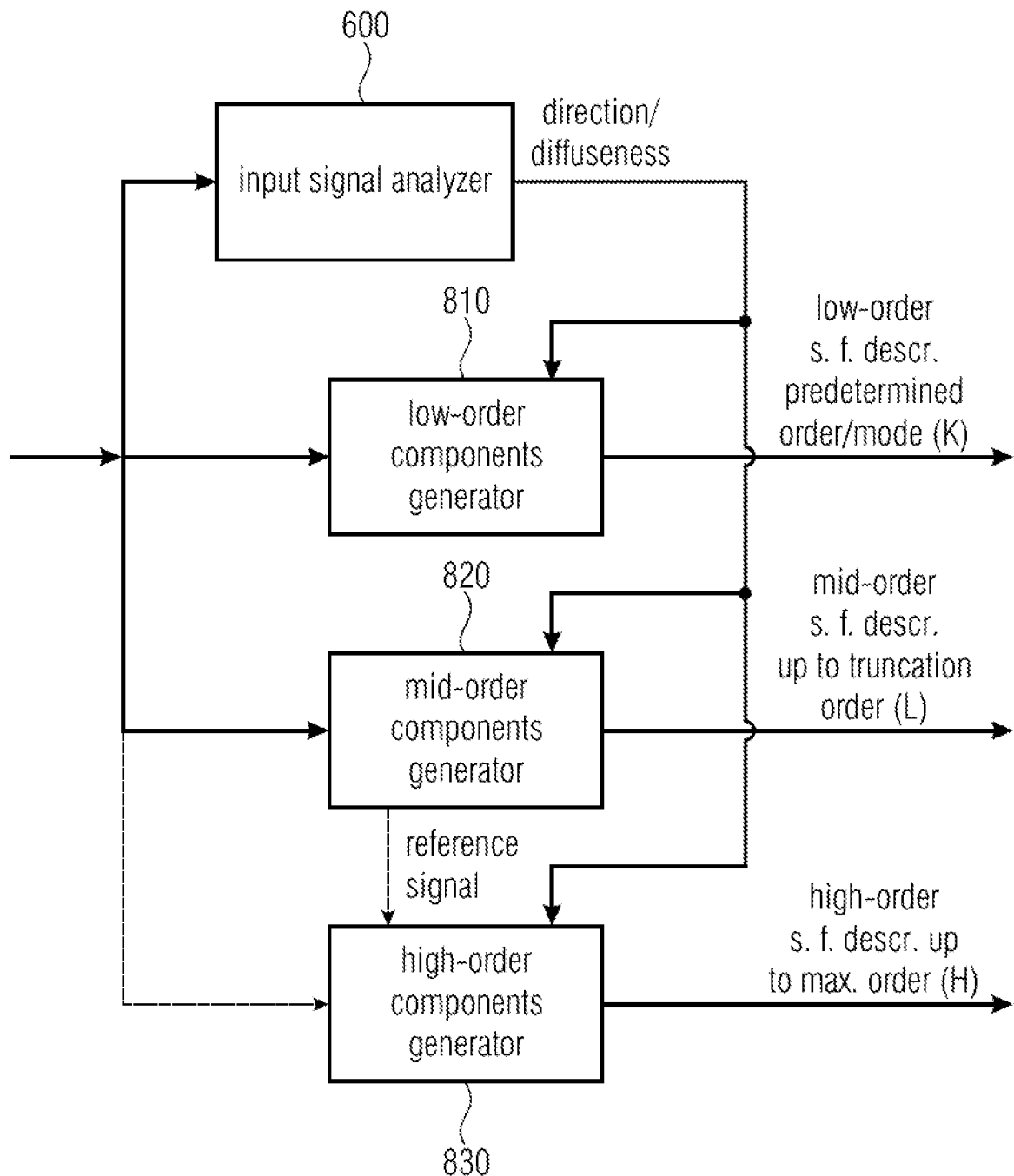
FIG. 8 illustrates an apparatus for generating a sound field description in accordance with a third aspect of the present invention.

FIG. 8 illustrates an implementation of the apparatus for generating a sound field description using an input signal comprising a mono-signal or a multi-channel signal in accordance with the third aspect of the present invention. The apparatus comprises an input signal analyzer 600 for analyzing the input signal to derive direction data and diffuseness data. Furthermore, the apparatus comprises a low-order components generator 810 for generating a low-order sound field description from the input signal up to a predetermined order and a predetermined mode, wherein the low-order components generator 810 is configured to derive the low-order sound field description by copying or taking the input signal or a portion of the input signal as it is or by performing a weighted combination of the channels of the input signal when the input signal is a multi-channel signal. Furthermore, the apparatus comprises a mid-order components generator 820 for generating a mid-order sound field description above the predetermined order or at the predetermined order and above the predetermined mode and below or at a first truncation order using a synthesis of at least one direct portion and of at least one diffuse portion using the direction data and the diffuseness data so that the mid-order sound field description comprises a direct contribution and a diffuse contribution.

The apparatus for generating the sound field description furthermore comprises a high-order components generator 830 for generating a high-order sound field description having a component above the first truncation order using a synthesis of at least one direct portion, wherein the high order sound field description comprises a direct contribution only. Thus, in an embodiment, the synthesis of the at least one direct portion is performed without any diffuse component synthesis, so that the high order sound field description comprises a direct contribution only.

Figure 1A:
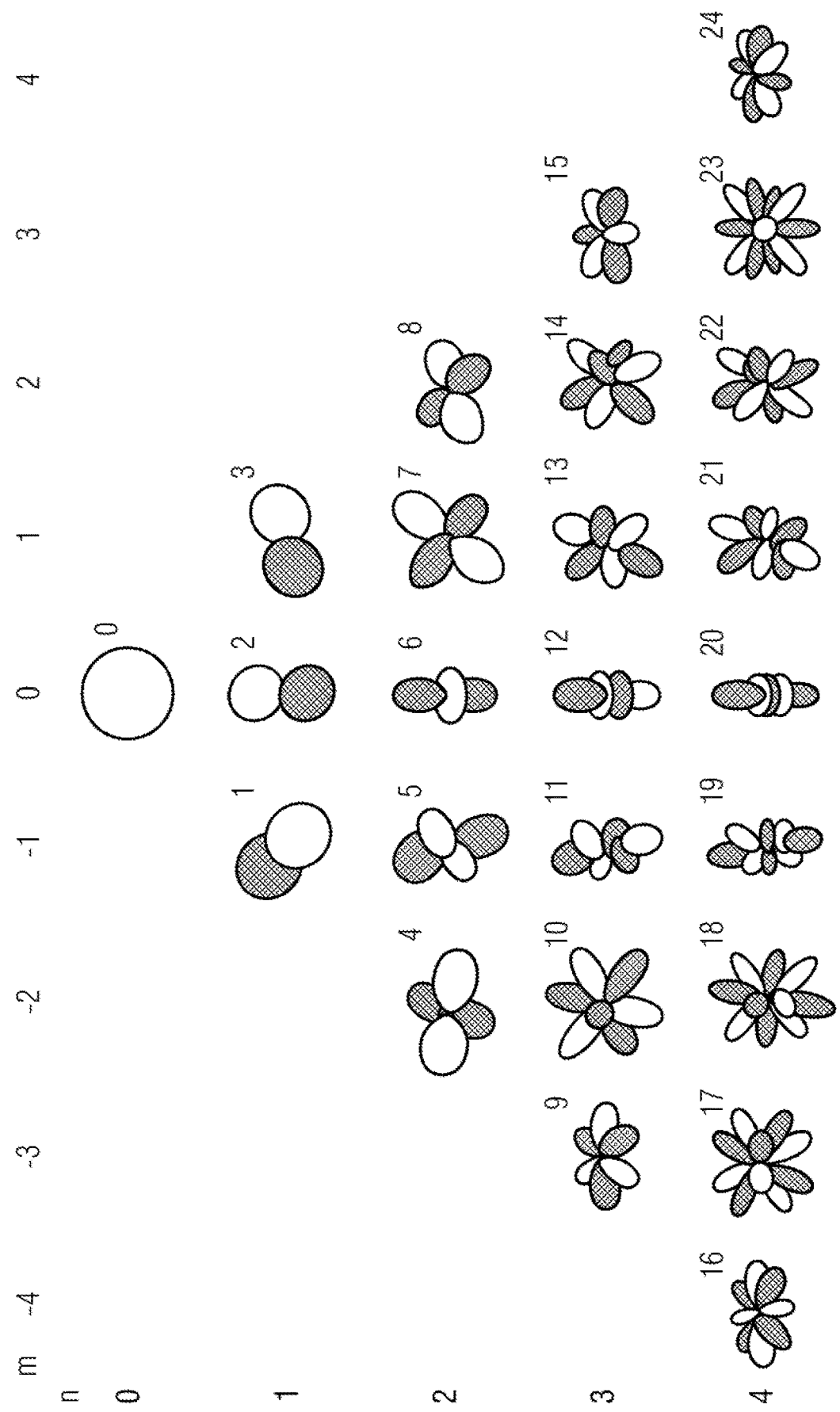
FIG. 1a illustrates spherical harmonics with Ambisonics channel/component numbering.
Figure 1B:
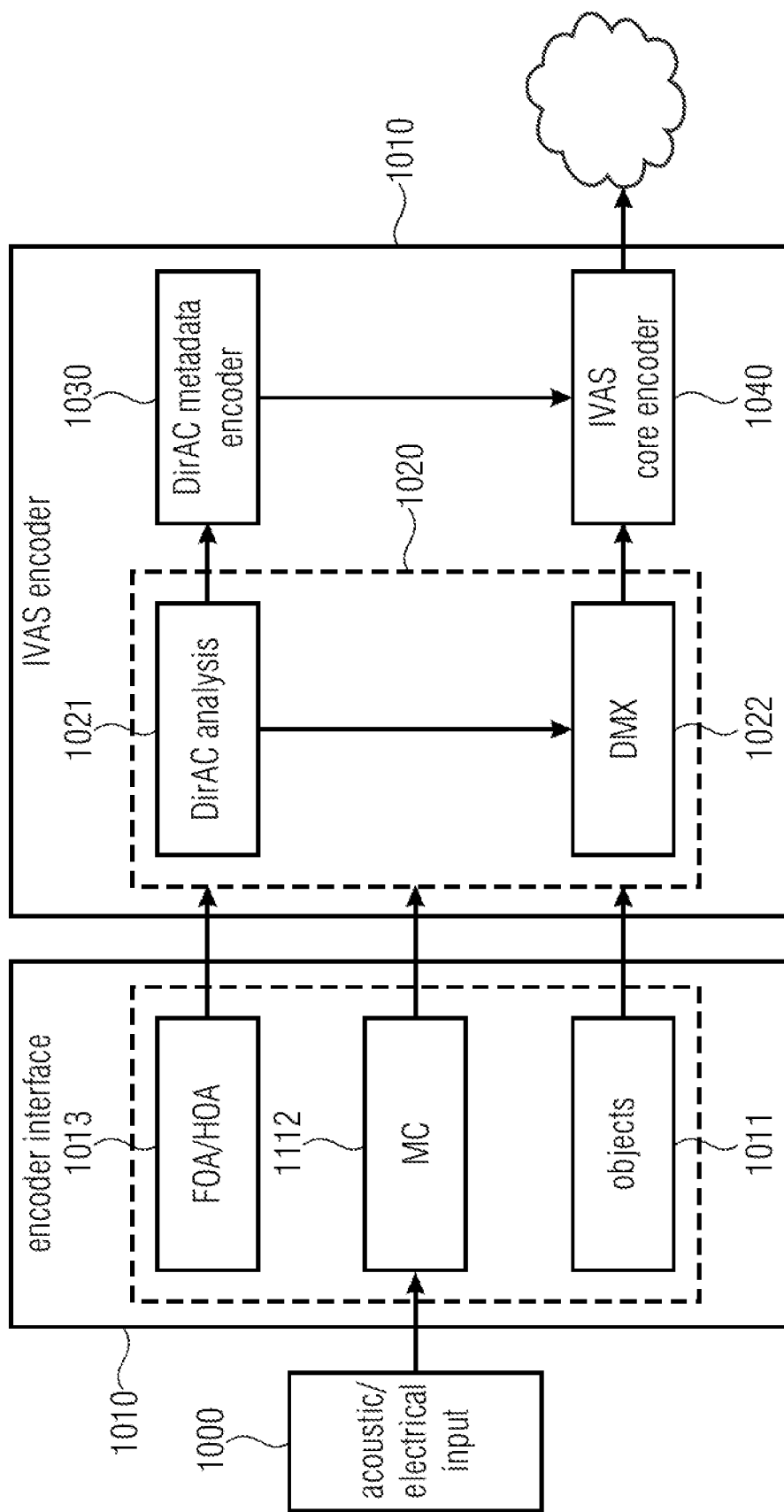
FIG. 1b illustrates an encoder side of a DirAC-based spatial audio coding processor.
Figure 2:
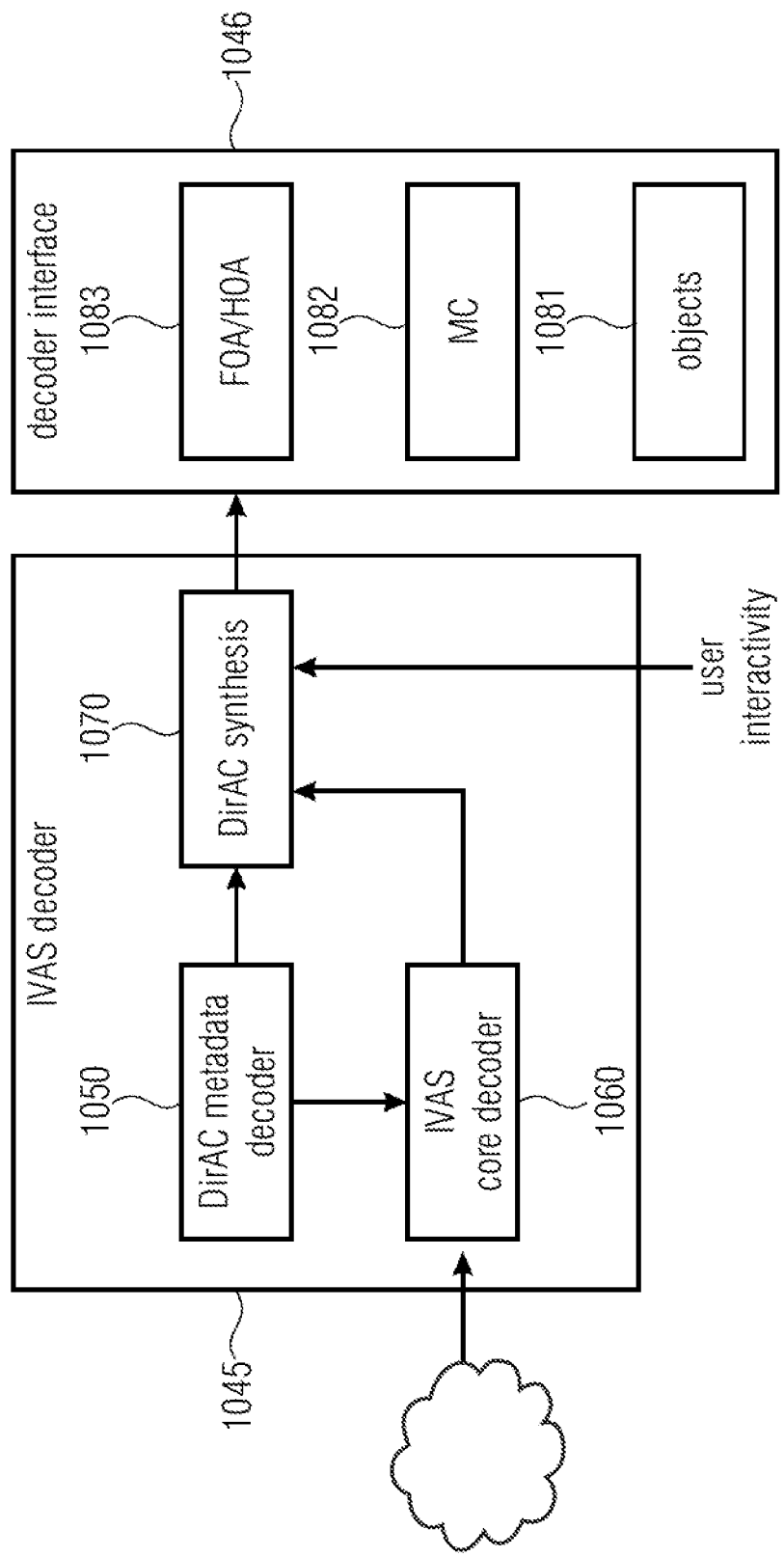
FIG. 2 illustrates a decoder of the DirAC-based spatial audio coding processor.

Thus, the low-order components generator 810 generates the low-order sound field description, the mid-order components generator 820 generates the mid-order sound field description and the high-order components generator generates the high-order sound field description. The low-order sound field description extends up to a certain order and mode as, for example, in the context of high-order Ambisonics spherical components as illustrated in FIG. 1. However, any other sound field description such as a sound field description with cylindrical functions or a sound field description with any other components different from any Ambisonics representation can be generated as well in accordance with the first, the second and/or the third aspect of the present invention.

The mid-order components generator 820 generates sound field components above the predetermined order or mode and up to a certain truncation order that is also indicated with L in the following description. Finally, the high-order components generator 830 is configured to apply the sound field components generation from the truncation order L up to a maximum order indicated as H in the following description.

Depending on the implementation, the energy compensation provided by the sound component generator 650 from FIG. 6 cannot be applied within the low-order components generator 810 or the mid-order components generator 820 as illustrated by the corresponding reference numbers in FIG. 6 for the direct/diffuse sound component. Furthermore, the second group of sound field components generated by sound field component generated by sound field component generator 650 corresponds to the output of the high-order components generator 830 of FIG. 8 illustrated by reference number 830 below the direct/not-diffuse notation in FIG. 6.

With respect to FIG. 7, it is indicated that the directional component energy compensation is performed within the low-order components generator 810 illustrated in FIG. 8, i.e., is performed to some or all sound field components up to the predetermined order and the predetermined mode as illustrated by reference number 810 above the upper arrow going out from block 750. The generation of the mid-order components and the high-order components is illustrated with respect to the upper hatched arrow going out of block 750 in FIG. 7 as illustrated by the reference numbers 820, 830 indicated below the upper arrow. Thus, the low-order components generator 810 of FIG. 8 may apply the diffuse energy compensation in accordance with the first aspect and the directional (direct) signal compensation in accordance with the second aspect, while the mid-order components generator 820 may perform the diffuse components compensation only, since the mid-order components generator generates output data having diffuse portions that can be enhanced with respect to their energy in order to have a higher diffuse component energy budget in the output signal.

Figure 4:
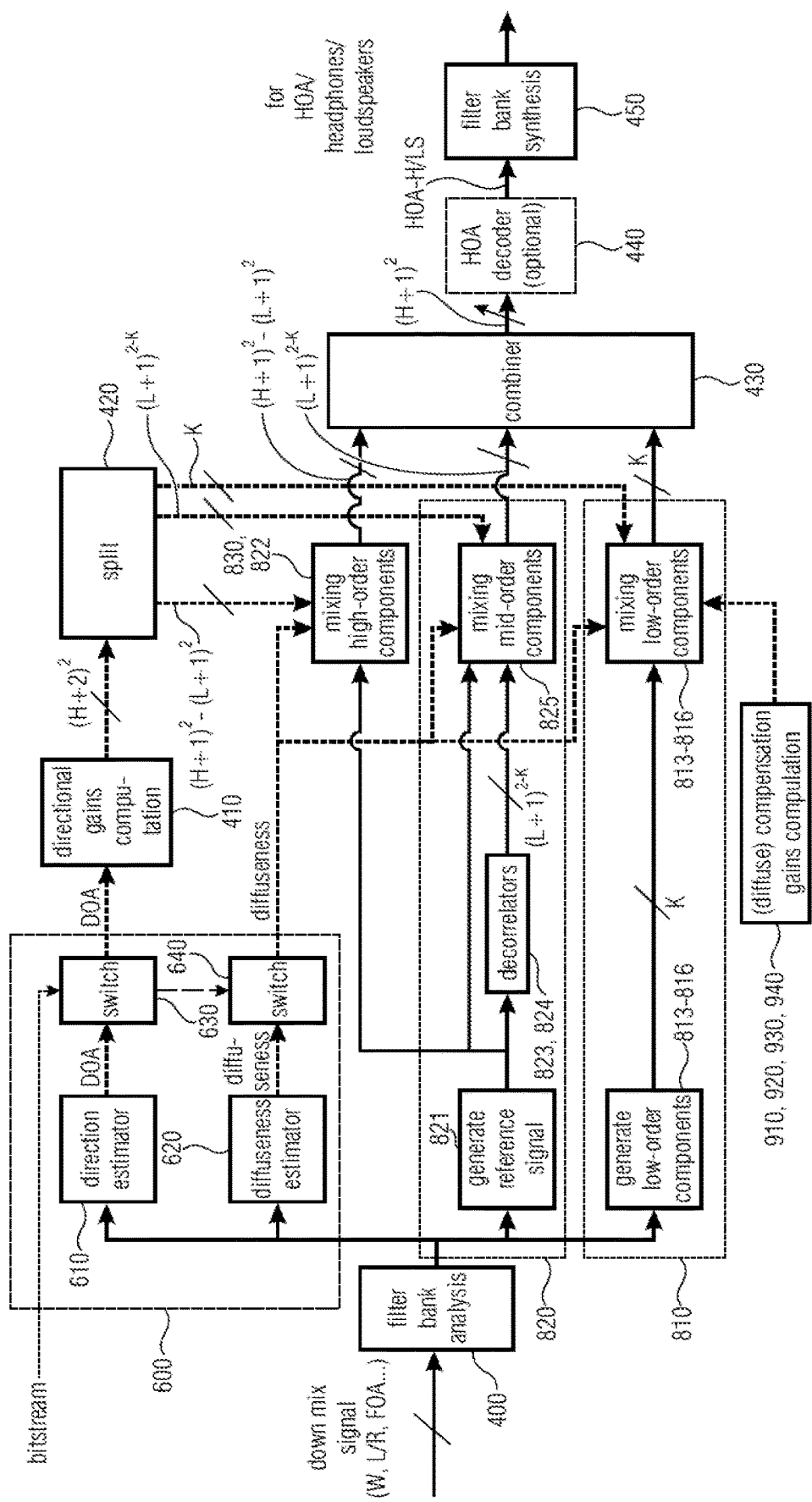
FIG. 4 illustrates an embodiment of the present invention applying the first aspect, the second aspect, and the third aspect.

Subsequently, reference is made to FIG. 4 illustrating an implementation of the first aspect, the second aspect and the third aspect of the present invention within one apparatus for generating a sound field description.

FIG. 4 illustrates the input analyzer 600. The input analyzer 600 comprises a direction estimator 610, a diffuseness estimator 620 and switches 630, 640. The input signal analyzer 600 is configured to analyze the input signal, typically subsequent to an analysis filter bank 400, in order to find, for each time/frequency bin direction information indicated as DOA and/or diffuseness information. The direction information DOA and/or the diffuseness information can also stem from a bitstream. Thus, in situations, where this data cannot be retrieved from the input signal, i.e., when the input signal only has an omnidirectional component W, then the input signal analyzer retrieves direction data and/or diffuseness data from the bitstream. When, for example, the input signal is a two-channel signal having a left channel L and a right channel R, then an analysis can be performed in order to obtain direction and/or diffuseness data. When the input signal is a first order Ambisonics signal (FOA) or, any other signal with more than two channels such as an A-format signal or a B-format signal, then an actual signal analysis performed by block 610 or 620 can be performed. However, when the bitstream is analyzed in order to retrieve, from the bitstream, the direction data and/or the diffuseness data, this also represents an analysis done by the input signal analyzer 600, but without an actual signal analysis as in the other case. In the latter case, the analysis is done on the bitstream, and the input signal consist of both the down-mix signal and the bitstream data.

Furthermore, the apparatus for generating a sound field description illustrated in FIG. 4 comprises a directional gains computation block 410, a splitter 420, a combiner 430, a decoder 440 and a synthesis filter bank 450. The synthesis filter bank 450 receives data for a high-order Ambisonics representation or a signal to be played out by headphones, i.e., a binaural signal, or a signal to be played out by loudspeakers arranged in a certain loudspeaker setup representing a multichannel signaled adapted to the specific loudspeaker setup from the sound field description that is typically agnostic of the specific loudspeaker setup.

Furthermore, the apparatus for generating the sound field description comprises a sound component generator generally consisting of the low-order components generator 810 comprising the "generating low order components" block and the "mixing low-order components" block. Furthermore, the mid-order components generator 820 is provided consisting of the generated reference signal block 821, decorrelators 823, 824 and the mixing mid-order components block 825. And, the high-order components generator 830 is also provided in FIG. 4 comprising the mixing high-order components block 822. Furthermore, a (diffuse) compensation gains computation block illustrated at reference numbers 910, 920, 930, 940 is provided. The reference numbers 910 to 940 are further explained with reference to FIGS. 12*a* to 12*c*.

Although not illustrated in FIG. 4, at least the diffuse signal energy compensation is not only performed in the sound component generator for the low order as explicitly illustrated in FIG. 4, but this energy compensation can also be performed in the mid-order components mixer 825.

Furthermore, FIG. 4 illustrates the situation, where the whole processing is performed to individual time/frequency tiles as generated by the analysis filter bank 400. Thus, for each time/frequency tile, a certain DOA value, a certain diffuseness value and a certain processing to apply these values and also to apply the different compensations is done. Furthermore, the sound field components are also generated/synthesized for the individual time/frequency tiles and the combination done by the combiner 430 also takes place within the time/frequency domain for each individual time/frequency tile, and, additionally, the procedure of the HOA decoder 440 is performed in the time/frequency domain and, the filter bank synthesis 450 then generates the time domain signals for the full frequency band with full bandwidth HOA components, with full bandwidth binaural signals for the headphones or with full bandwidth loudspeaker signals for loudspeakers of a certain loudspeaker setup.

Embodiments of the present invention exploit two main principles:

- The diffuse sound Ambisonics components $P_{diff,l}^m$ can be restricted to be synthesized only for the low-order components of the synthesized Ambisonics signal up to order L<H.
- From, the down-mix signal, K low-order Ambisonics components can usually be extracted, for which a full synthesis is not needed.
  - In case of mono down-mix, the down-mix usually represents the omni-directional component W of the Ambisonics signal.
  - In case of stereo down-mix, the left (L) and right (R) channels can be easily be transformed into Ambisonics components W and Y.

$$\begin{cases} W = L + R \\ Y = L - R \end{cases}$$

In case of a FOA down-mix, the Ambisonics components of order 1 are already available. Alternatively, the FOA can be recovered from a linear combination of a 4 channels down-mix signal DMX which is for example in A-format:

$$\begin{bmatrix} W \\ Y \\ Z \\ X \end{bmatrix} = T^{-1} \begin{bmatrix} DMX_0 \\ DMX_1 \\ DMX_2 \\ DMX_3 \end{bmatrix}$$

With $$T = 0.5 \begin{bmatrix} 1 & \sin\theta & 0 & \cos\theta \\ 1 & -\sin\theta & 0 & \cos\theta \\ 1 & 0 & \sin\theta & -\cos\theta \\ 1 & 0 & -\sin\theta & -\cos\theta \end{bmatrix}$$

and $$\theta = \cos^{-1} \frac{1}{\sqrt{3}}$$

Over these two principles, two enhancements can also be applied:

- The loss of energy by not modelling the diffuse sound Ambisonics components till the order H can be compensated by amplifying the K low-order Ambisonics components extracted from the down-mix signal.
- In transmission applications where the down-mix signal is lossy coded, the transmitted down-mix signal is corrupted by quantization errors which can be mitigated by constraining the energy relationship of the K low-order Ambisonics components extracted from the down-mix signal.

Figure 3:
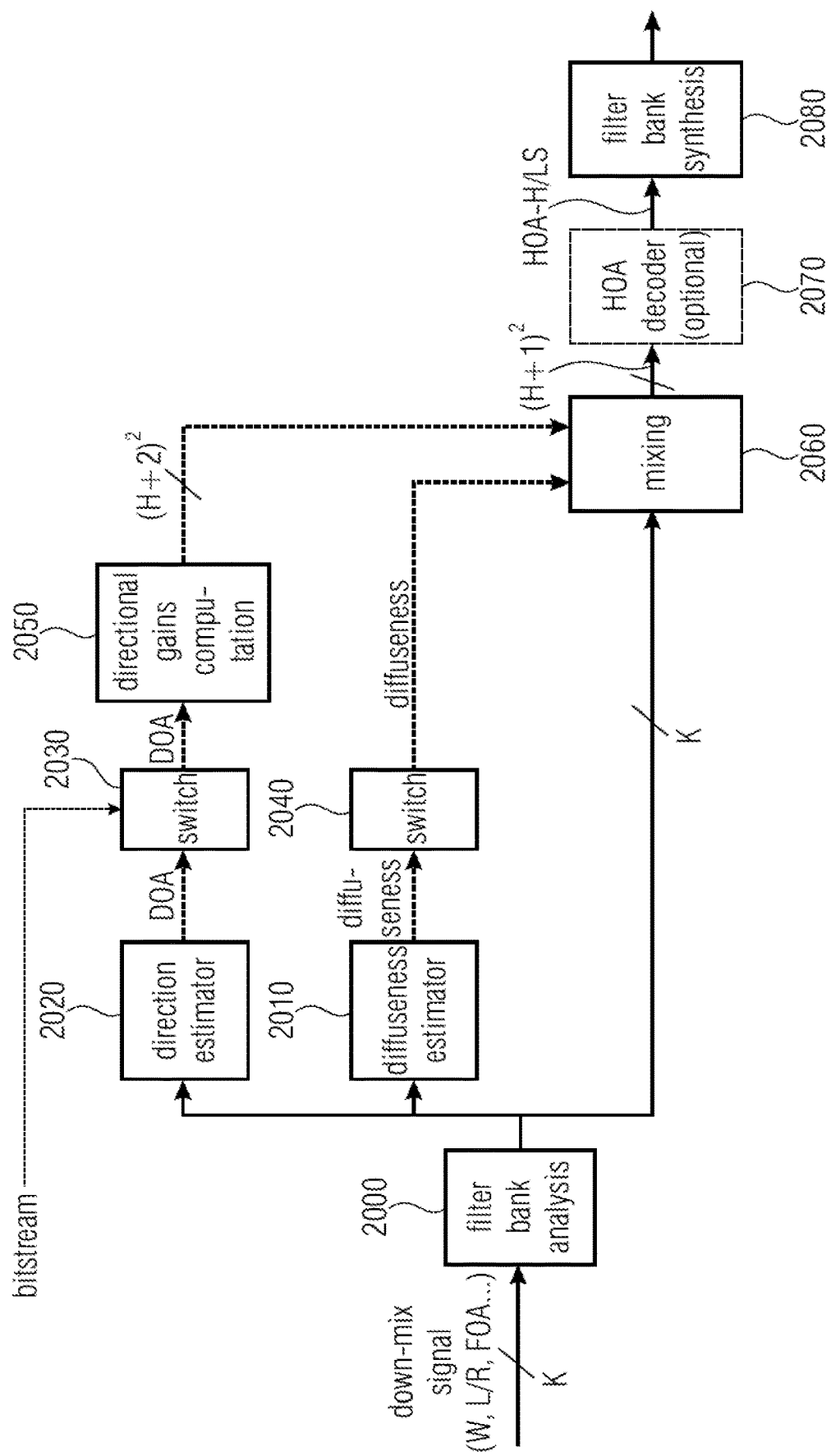
FIG. 3 illustrates a high order Ambisonics synthesis processor known from the art.

FIG. 4 illustrates an embodiment of the new method. One difference from the state-of-the depicted in FIG. 3 is the differentiation of the mixing process which differs according to the order of the Ambisonics component to be synthesized. The components of the low-orders are mainly determined from the low-order components extracted directly from the down-mix signal. The mixing of the low-order components can be as simple as copying directly the extracted components to the output.

However, in the embodiment, the extracted components are further processed by applying an energy compensation, function of the diffuseness and the truncation orders L and H, or by applying an energy normalization, function of the diffuseness and the sound directions, or by applying both of them.

The mixing of the mid-order components is actually similar to the state-of-the art method (apart from an optional diffuseness compensation), and generates and combines both direct and diffuse sounds Ambisonics components up to truncation order L but ignoring the K low-order components already synthesized by the mixing of low-order components. The mixing of the high-order components consists of generating the remaining $(H-L+1)^2$ Ambisonics components up to truncation order H but only for the direct sound and ignoring the diffuse sound. In the following the mixing or generating of the low-order components is detailed.

The first aspect relates to the energy compensation generally illustrated in FIG. 6 giving a processing overview on the first aspect. The principle is explained for the specific case for $K=(L+1)^2$ without loss of generality.

Figure 5:
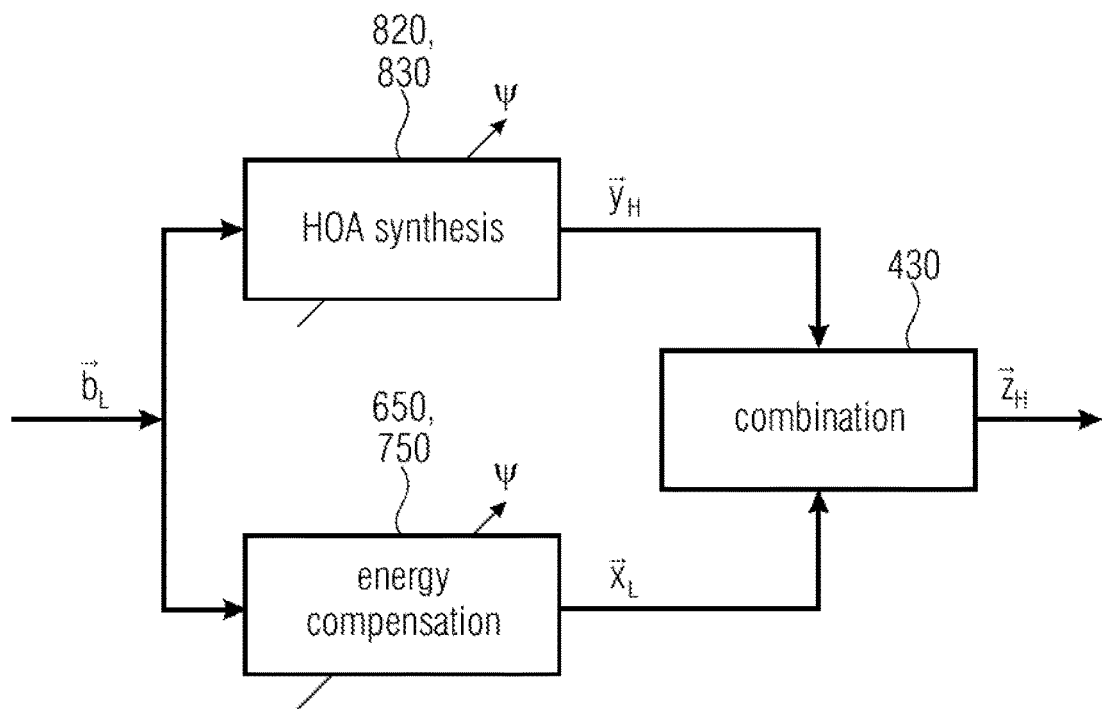
FIG. 5 illustrates an energy compensation overview processing.

FIG. 5 shows an overview of the processing. The input vector $\vec{b}_L$ is a physically correct Ambisonics signal of truncation order L. It contains $(L+1)^2$ coefficients denoted by $B_{m,l}$, where $0 \leq l \leq L$ is the order of the coefficient and $-l \leq m \leq l$ is the mode. Typically, the Ambisonics signal $\vec{b}_L$ is represented in the time-frequency domain.

In the HOA synthesis block 820, 830, the Ambisonics coefficients are synthesized from $\vec{b}_L$ up to a maximum order H, where H>L. The resulting vector $\vec{y}_H$ contains the synthesized coefficients of order $L<l \leq H$, denoted by $Y_{m,l}$. The HOA synthesis normally depends on the diffuseness $\Psi$ (or a similar measure), which describes how diffuse the sound field for the current time-frequency point is. Normally, the coefficients in $\vec{y}_H$ only are synthesized if the sound field becomes non-diffuse, whereas in diffuse situations, the coefficients become zero. This prevents artifacts in diffuse situations, but also results in a loss of energy. Details on the HOA synthesis are explained later.

To compensate for the loss of energy in diffuse situations mentioned above, we apply an energy compensation to $\vec{b}_L$ in the energy compensation block 650, 750. The resulting signal is denoted by $\vec{x}_L$ and has the same maximum order L as $\vec{b}_L$. The energy compensation depends on the diffuseness (or similar measure) and increases the energy of the coefficients in diffuse situations such that the loss of energy of the coefficients in $\vec{y}_H$ is compensated. Details are explained later.

In the combination block, the energy compensated coefficients in $\vec{x}_L$ are combined 430 with the synthesized coefficients in $\vec{y}_H$ to obtain the output Ambisonics signal $\vec{z}_H$ containing all $(H+1)^2$ coefficients, i.e., $$\vec{z}_H = \begin{bmatrix} \vec{x}_L \\ \vec{y}_H \end{bmatrix}.$$

Subsequently, a HOA synthesis is explained as an embodiment. There exist several state-of-the-art approaches to synthesize the HOA coefficients in $\vec{y}_H$, e.g., a covariance-based rendering or a direct rendering using Directional Audio Coding (DirAC). In the simplest case, the coefficients in $\vec{y}_H$ are synthesized from the omnidirectional component $B_0^0$ in $\vec{b}_L$ using $$Y_l^m = B_0^0 \sqrt{1-\Psi} G_l^m(\varphi,\theta).$$

Here, $(\varphi, \theta)$ is the direction-of-arrival (DOA) of the sound and $G_l^m(\varphi, \theta)$ is the corresponding gain of the Ambisonics coefficient of order l and mode m. Normally, $G_l^m(\varphi, \theta)$ corresponds to the real-valued directivity pattern of the well-known spherical harmonic function of order l and mode m, evaluated at the DOA $(\varphi, \theta)$. The diffuseness $\Psi$ becomes 0 if the sound field is non-diffuse, and 1 if the sound field is diffuse. Consequently, the coefficients $Y_l^m$ computed above order L become zero in diffuse recording situations. Note that the parameters $\varphi$, $\theta$ and $\Psi$ can be estimated from a first-order Ambisonics signal $\vec{b}_1$ based on the active sound intensity vector as explained in the original DirAC papers.

Subsequently the energy compensation of the diffuse sound components is discussed. To derive the energy compensation, we consider a typical sound field model where the sound field is composed of a direct sound component and a diffuse sound component, i.e., the omnidirectional signal can be written as $$B_0^0 = P_s + P_d,$$

where $P_s$ is the direct sound (e.g., plane wave) and $P_d$ is the diffuse sound. Assuming this sound field model and an SN3D normalization of the Ambisonics coefficients, the expected power of the physically correct coefficients $B_{m,l}$ is given by $$E\{|B_l^m|^2\} = E\{|G_l^m(\varphi,\theta)|^2\}\Phi_s + Q_l\Phi_d.$$

Here, $\Phi_s = E\{|P_s|^2\}$ is the power of the direct sound and $\Phi_d = E\{|P_d|^2\}$ is the power of the diffuse sound. Moreover, $Q_l$ is the directivity factor of the coefficients of the l-th order, which is given by $Q_l = 1/N$ where $N = 2l+1$ is the number of coefficients per order l. To compute the energy compensation, we either can consider the DOA $(\varphi, \theta)$ (more accurate energy compensation) or we assume that $(\varphi, \theta)$ is a uniformly distributed random variable (more practical approach). In the latter case, the expected power of $B_l^m$ is $$E\{|B_l^m|^2\} = Q_l\Phi_s + Q_l\Phi_d.$$

In the following, let $\vec{b}_H$ denote a physically correct Ambisonics signal of maximum order H. Using the equations above, the total expected power of $\vec{b}_H$ is given by $$\sum_{l=0}^{H}\sum_{m=-l}^{l} E\{|B_l^m|^2\} = (H+1)\Phi_s + (H+1)\Phi_d.$$

Similarly, when using the common diffuseness definition $$\Psi = \frac{\Phi_d}{\Phi_s + \Phi_d},$$

the total expected power of the synthesized Ambisonics signal $\vec{y}_H$ is given by $$\sum_{l=L+1}^{H}\sum_{m=-l}^{l} E\{|Y_l^m|^2\} = (H-L)\Phi_s.$$

The energy compensation is carried out by multiplying a factor g to $\vec{b}_L$, i.e., $$\vec{x}_L = g\vec{b}_L.$$

The total expected power of the output Ambisonics signal $\vec{z}_H$ now is given by $$\sum_{l=0}^{H}\sum_{m=-l}^{l} E\{|Z_l^m|^2\} = \underbrace{g^2(L+1)\Phi_s + g^2(L+1)\Phi_d}_{\text{total power }\vec{x}_L} + \underbrace{(H-L)\Phi_s}_{\text{total power }\vec{y}_H}.$$

The total expected power of $\vec{z}_H$ should match the total expected power of $\vec{b}_H$. Therefore, the squared compensation factor is computed as $$g^2 = \frac{(L+1)\Phi_s + (H+1)\Phi_d}{(L+1)(\Phi_s + \Phi_d)}$$

This can be simplified to $$g = \sqrt{1 + \Psi\left(\frac{H+1}{L+1} - 1\right)},$$

where $\Psi$ is the diffuseness, L is the maximum order of the input Ambisonics signal, and H is the maximum order of the output Ambisonics signal.

It is possible to adopt the same principle for $K < (L+1)^2$ where the $(L+1)^2 - K$ diffuse sound Ambisonics components are synthesized using decorrelators and an average diffuse response.

In certain cases, $K < (L+1)^2$ and no diffuse sound components are synthesized. It is especially true for high frequencies where absolute phases are inaudible and the usage of decorrelators irrelevant. The diffuse sound components can be then modelled by the energy compensation by computing the order Lk and the number of modes mk corresponding to the K low-order components, wherein K represents a number of diffuse components in the first group:

$$\begin{cases} Lk = \lfloor\sqrt{K} - 1\rfloor \\ mk = K - (Lk+1)^2 \\ N = 2(Lk+1) + 1 \end{cases},$$

The compensating gain becomes then:

$$g = \sqrt{1 + \Psi\left(\frac{H+1}{Lk+1+\frac{mk}{N}} - 1\right)}$$

Subsequently, embodiments of the energy normalization of direct sound components corresponding to the second aspect generally illustrated in FIG. 7 is illustrated. In the above, the input vector $\vec{b}_L$ was assumed to be a physically correct Ambisonics signal of maximum order L. However, the down-mix input signal may be affected by quantization errors, which may break the energy relationship. This relationship can be restored by normalizing the down-mix input signal:

$$\vec{x}_L = g_s \vec{b}_L.$$

Given the direction of sound and the diffuseness parameters, direct and diffuse components can be expressed as:

$$P_{s,l}^m = B_0^0 \sqrt{1-\Psi} G_l^m(\varphi,\theta)$$

$$P_{d,l}^m = \sqrt{\Psi} B_l^m.$$

The expected power according to the model can be then expressed for each components of $\vec{x}_L$ as:

$$E\{|X_l^m|^2\} = g_s^2 E\{|B_l^m|^2\} = E\{|B_0^0|^2\}(1-\Psi)(G_l^m(\varphi,\theta))^2 + \Psi Q_l E\{|B_0^0|^2\}$$

The compensating gain becomes then:

$$g_s = \sqrt{\frac{E\{|B_0^0|^2\}}{E\{|B_l^m|^2\}}(Q_l \Psi + (1-\Psi)(G_l^m(\varphi,\theta))^2)},$$

where $0 \leq l \leq L$ and $-l \leq m \leq l$

Alternatively, the expected power according to the model can be then expressed for each components of $\vec{x}_L$ as:

$$E\{|X_l^m|^2\} = g_s^2 E\{|B_l^m|^2\} = E\{|B_0^0|^2\} = (1-\Psi)(G_l^m(\varphi,\theta))^2 + \Psi E\{|B_l^m|^2\}$$

The compensating gain becomes then:

$$g_s = \sqrt{\Psi + \frac{E\{|B_0^0|^2\}}{E\{|B_l^m|^2\}}(1-\Psi)(G_l^m(\varphi,\theta))^2},$$

where $0 \leq l \leq L$ and $-l \leq m \leq l$ $B_0^0$ and $B_l^m$ are complex values and for the calculation of $g_s$, the norm or magnitude or absolute value or the polar coordinate representation of the complex value is taken and squared to obtain the expected power or energy as the energy- or amplitude-related measure.

The energy compensation of diffuse sound components and the energy normalization of direct sound components can be achieved jointly by applying a gain of the form:

$$g_{s,d} = g \cdot g_s$$

In a real implementation, the obtained normalization gain, the compensation gain or the combination of the two can be limited for avoiding large gain factors resulting in severe equalization which could lead to audio artefacts. For example the gains can be limited to be between −6 and +6 dB. Furthermore, the gains can be smoothed over time and/or frequency (by a moving average or a recursive average) for avoiding abrupt changes and for then stabilization process.

Subsequently, some of the benefits and advantages of embodiments over the state of the art will be summarized.
    Simplified (less complex) HOA synthesis within DirAC.
        More direct synthesis without a full synthesis of all Ambisonics components.
        Reduction of the number of decorrelators needed and their impact on the final quality.
        Reduction of the coding artefacts introduced in the down-mix signal during the transmission.
        Separation of the processing for three different orders to have an optimum trade-off between quality and processing efficiency.

Subsequently, several inventive aspects partly or fully included in the above description are summarized that can be used independent from each other or in combination with each other or only in a certain combination combining only arbitrarily selected two aspects from the three aspects.

First Aspect: Energy Compensation for the Diffuse Sound Components

This invention starts from the fact that when a sound field description is generated from an input signal comprising one or more signal components, the input signal can be analyzed for obtaining at least diffuseness data for the sound field represented by the input signal. The input signal analysis can be an extraction of diffuseness data associated as metadata to the one or more signal components or the input signal analysis can be a real signal analysis, when, for example, the input signal has two, three or even more signal components such as a full first order representation such as a B-format representation or an A-format representation.

Now, there is a sound component generator that generates one or more sound field components of a first group that have a direct component and a diffuse component. And, additionally, one or more sound field components of a second group is generated, where, for such a second group, the sound field component only has direct components.

In contrast to a full sound field generation, this will result in an energy error provided that the diffuseness value for the current frame or the current time/frequency bin under consideration has a value different from zero.

In order to compensate for this energy error, an energy compensation is performed when generating the first group of sound field components. This energy compensation depends on the diffuseness data and a number of sound field components in the second group representing the energy loss due to the non-synthesis of diffuse components for the second group.

In one embodiment, the sound component generator for the first group can be the low order branch of FIG. 4 that extracts the sound field components of the first group by means of copying or performing a weighted addition, i.e., without performing a complex spatial basis function evaluation. Thus, the sound field component of the first group is not separately available as a direct portion and a diffuse portion. However, increasing the whole sound field component of the first group with respect to its energy automatically increases the energy of the diffuse portion.

Alternatively, the sound component generator for the one or more sound field components of the first group can also be the mid-order branch in FIG. 4 relying on a separate direct portion synthesis and diffuse portion synthesis. Here, we have the diffuse portion separately available and in one embodiment, the diffuse portion of the sound field component is increased but not the direct portion in order to compensate the energy loss due to the second group. Alternately, however, one could, in this case, increase the energy of the resulting sound field component after having combined the direct portion and the diffuse portion.

Alternatively, the sound component generator for the one or more sound field components of the first group can also be the low and mid-order components branches in FIG. 4.

The energy compensation can be then applied only to the low-order components, or to both the low- and mid-order components.

Second Aspect: Energy Normalization of Direct Sound Components

In this invention, one starts from the assumption that the generation of the input signal that has two or more sound components was accompanied by some kind of quantization. Typically, when one considers two or more sound components, one sound component of the input signal can be an omnidirectional signal, such as omnidirectional microphone signals W in a B-format representation, and the other sound components can be individual directional signals, such as the figure-of-eight microphone signals X, Y, Z in a B-format representation, i.e., a first order Ambisonics representation.

When a signal encoder comes into a situation that the bitrate requirements are too high for a perfect encoding operation, then a typical procedure is that the encoder encodes the omnidirectional signal as exact as possible, but the encoder only spends a lower number of bits for the directional components which can even be so low that one or more directional components are reduced to zero completely. This represents such an energy mismatch and loss in directional information.

Now, one nevertheless has the requirement which, for example, is obtained by having explicit parametric side information saying that a certain frame or time/frequency bin has a certain diffuseness being lower than one and a sound direction. Thus, the situation can arise that one has, in accordance with the parametric data, a certain non-diffuse component with a certain direction while, on the other side, the transmitted omnidirectional signal and the directional signals don't reflect this direction. For example, the omnidirectional signal could have been transmitted without any significant loss of information while the directional signal, Y, responsible for left and right direction could have been set to zero for lack of bits reason. In this scenario, even if in the original audio scene a direct sound component is coming from the left, the transmitted signals will reflect an audio scene without any left-right directional characteristic.

Thus, in accordance with the second invention, an energy normalization is performed for the direct sound components in order to compensate for the break of the energy relationship with the help of direction/diffuseness data either being explicitly included in the input signal or being derived from the input signal itself.

This energy normalization can be applied in the context of all the individual processing branches of FIG. 4 either altogether or only separately.

This invention allows to use the additional parametric data either received from the input signal or derived from non-compromised portions of the input signal, and, therefore, encoding errors being included in the input signal for some reason can be reduced using the additional direction data and diffuseness data derived from the input signal.

In this invention, an energy- or amplitude-related measure for an omnidirectional component derived from the input signal and a further energy- or amplitude-related measure for the directional component derived from the input signal are estimated and used for the energy compensation together with the direction data and the diffuseness data. Such an energy- or amplitude-related measure can be the amplitude itself, or the power, i.e., the squared and added amplitudes or can be the energy such as power multiplied by a certain time period or can be any other measure derived from the amplitude with an exponent for an amplitude being different from one and a subsequent adding up. Thus, a further energy- or amplitude-related measure might also be a loudness with an exponent of three compared to the power having an exponent of two.

Third Aspect: System Implementation with Different Processing Procedures for the Different Orders In the third invention, which is illustrated in FIG. 4, a sound field is generated using an input signal comprising a mono-signal or a multi-component signal having two or more signal components. A signal analyzer derives direction data and diffuseness data from the input signal either by an explicit signal analysis in the case of the input signal have two or more signal components or by analyzing the input signal in order to extract direction data and diffuseness data included in the input signal as metadata.

A low-order components generator generates the low-order sound description from the input signal up to a predetermined order and performs this task for available modes which can be extracted from the input signal by means of copying a signal component from the input signal or by means of performing a weighted combination of components in the input signal.

The mid-order components generator generates a mid-order sound description having components of orders above the predetermined order or at the predetermined order and above the predetermined mode and lower or equal to a first truncation order using a synthesis of at least one direct component and a synthesis of at least one diffuse component using the direction data and the diffuseness data obtained from the analyzer so that the mid-order sound description comprises a direct contribution and a diffuse contribution.

Furthermore, a high-order components generator generates a high-order sound description having components of orders above the first truncated and lower or equal to a second truncation order using a synthesis of at least one direct component without any diffuse component synthesis so that the high-order sound description has a direct contribution only.

This system invention has significant advantages in that an exact as possible low-order sound field generation is done by utilizing the information included in the input signal as good as possible while, at the same time, the processing operations to perform the low-order sound description involve low efforts due to the fact that only copy operations or weighted combination operations such as weighted additions are needed. Thus, a high quality low-order sound description is performed with a minimum amount of needed processing power.

The mid-order sound description involves more processing power, but allows to generate a very accurate mid-order sound description having direct and diffuse contributions using the analyzed direction data and diffuseness data typically up to an order, i.e., the high order, below which a diffuse contribution in a sound field description is still needed from a perceptual point of view.

Finally, the high-order components generator generates a high-order sound description only by performing a direct synthesis without performing a diffuse synthesis. This, once again, reduces the amount of needed processing power due to the fact that only the direct components are generated while, at the same time, the omitting of the diffuse synthesis is not so problematic from a perceptual point of view.

Naturally, the third invention can be combined with the first invention and/or the second invention, but even when, for some reasons, the compensation for not performing the diffuse synthesis with the high-order components generator is not applied, the procedure nevertheless results in an optimum compromise between processing power on the one hand and audio quality on the other hand. The same is true for the performing of the low-order energy normalization compensating for the encoding used for generating the input signal. In an embodiment, this compensation is additionally performed, but even without this compensation, significant non-trivial advantages are obtained.

FIG. 4 illustrates, as a symbolical illustration of a parallel transmission, the number of components processed by each components generator. The low-order components generator 810 illustrated in FIG. 4 generates a low-order sound field description from the input signal up to a predetermined order and a predetermined mode, where the low-order components generator 810 is configured to derive the low-order sound field description by copying or taking the input signal as it is or performing a weighted combination of the channels of the input signal. As illustrated between the generator low-order components block and the mixing low-order components block, K individual components are processed by this low-order components generator 810. The mid-order components generator 820 generates the reference signal and, as an exemplary situation, it is outlined that the omnidirectional signal included in the down-mix signal at the input or the output of the filter bank 400 is used. However, when the input signal has the left channel and the right channel, then the mono signal obtained by adding the left and the right channel is calculated by the reference signal generator 821. Furthermore, the number of $(L+1)^2-K$ components are generated by the mid-order components generator. Furthermore, the high-order components generator generates a number of $(H+1)^2-(L+1)^2$ components so that, in the end, at the output of the combiner, $(H+1)^2$ components are there from the single or several (small number) of components at the input into the filter bank 400. The splitter is configured to provide the individual directional/diffuseness data to the corresponding components generators 810, 820, 830. Thus, the low-order components generator receives the K data items. This is indicated by the line collecting the splitter 420 and the mixing low-order components block.

Furthermore, the mixing mix-order components block 825 receives $(L+1)^2-K$ data items, and the mixing high-order components block receives $(H+1)^2-(L+1)^2$ data items. Correspondingly, the individual mixing components blocks provide a certain number of sound field components to the combiner 430.

Figure 9:
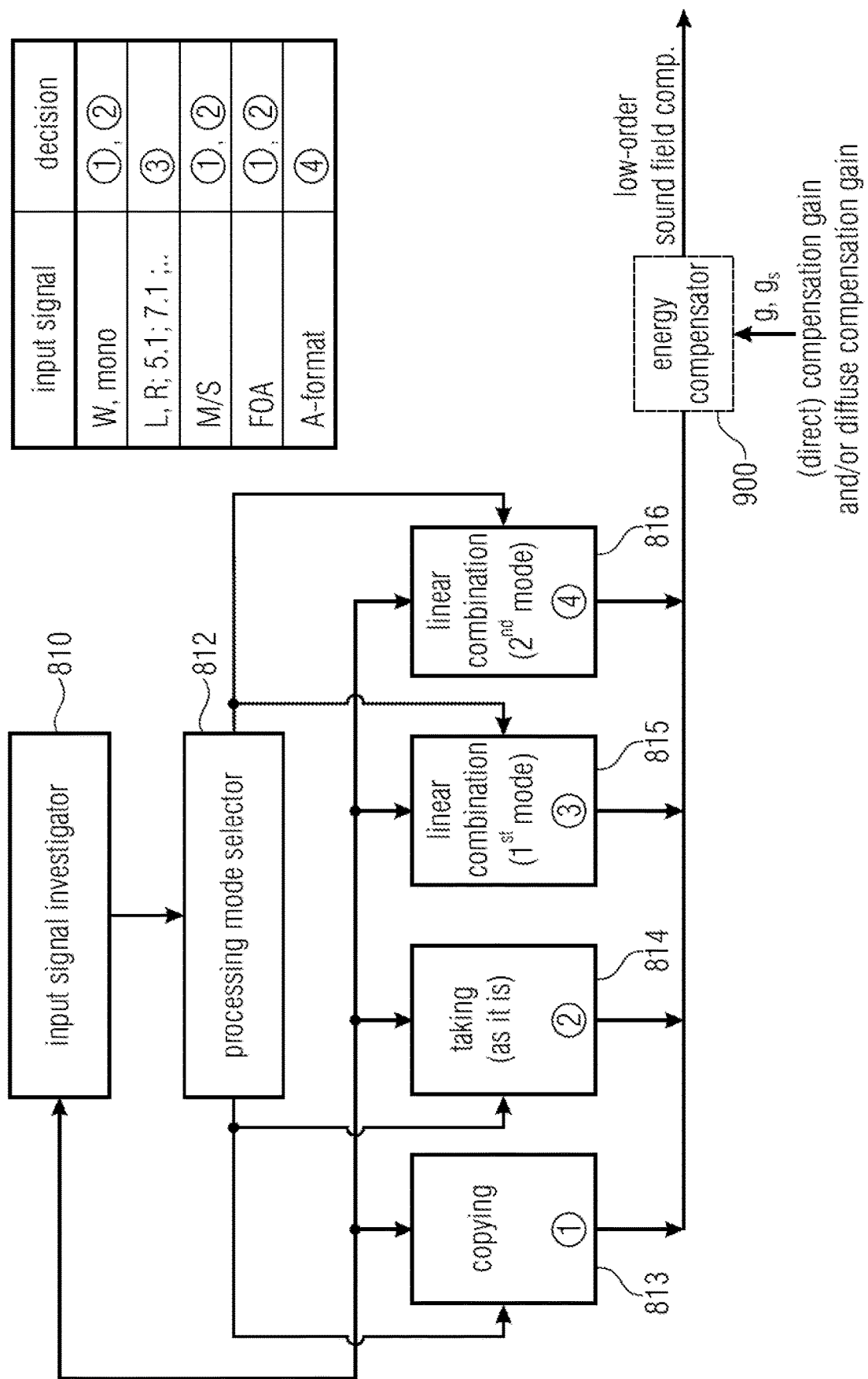
FIG. 9 illustrates an implementation of the low-order components generator of FIG. 8.

Subsequently, an implementation of the low-order components generator 810 of FIG. 4 is illustrated with respect to FIG. 9. The input signal is input into an input signal investigator 811, and the input signal investigator 811 provides the acquired information to a processing mode selector 812. The processing mode selector 812 is configured to select a plurality of different processing modes which are schematically illustrated as a copying block 813 indicated by number 1, a taking (as it is) block 814 indicated by number 2, a linear combination block (first mode) indicated by number 3 and by reference number 815, and a linear combination (second mode) block 816 indicated by number 4. For example, when the input signal investigator 811 determines a certain kind of input signal then the processing mode selector 812 selects one of the plurality of different processing modes as shown in the table of FIG. 9. For example, when the input signal is an omnidirectional signal W or a mono signal then copying 813 or taking 814 is selected. However, when the input signal is a stereo signal with a left channel or a right channel or a multichannel signal with 5.1 or 7.1 channels then the linear combination block 815 is selected in order to derive, from the input signal, the omnidirectional signal W by adding left and right and by calculating a directional component by calculating the difference between left and right.

However, when the input signal is a joint stereo signal, i.e., a mid/side representation then either block 813 or block 814 is selected since the mid signal already represents the omnidirectional signal and the side signal already represents the directional component.

Similarly, when it is determined that the input signal is a first order Ambisonics signal (FOA) then either block 813 or block 814 is selected by the processing mode selector 812. However, when it is determined that the input signal is a A-format signal then the linear combination (second mode) block 816 is selected in order to perform a linear transformation on the A-format signal to obtain the first order Ambisonics signal having the omnidirectional component and three-directional components representing the K low-order components blocks generated by block 810 of FIG. 8 or FIG. 6. Furthermore, FIG. 9 illustrates an energy compensator 900 that is configured to perform an energy compensation to the output of one of the blocks 813 to 816 in order to perform the fuse compensation and/or the direct compensation with corresponding gain values g and $g_s$.

Hence, the implementation of the energy compensator 900 corresponds to the procedure of the sound component generator 650 or the sound component generator 750 of FIG. 6 and FIG. 7, respectively.

Figure 10:
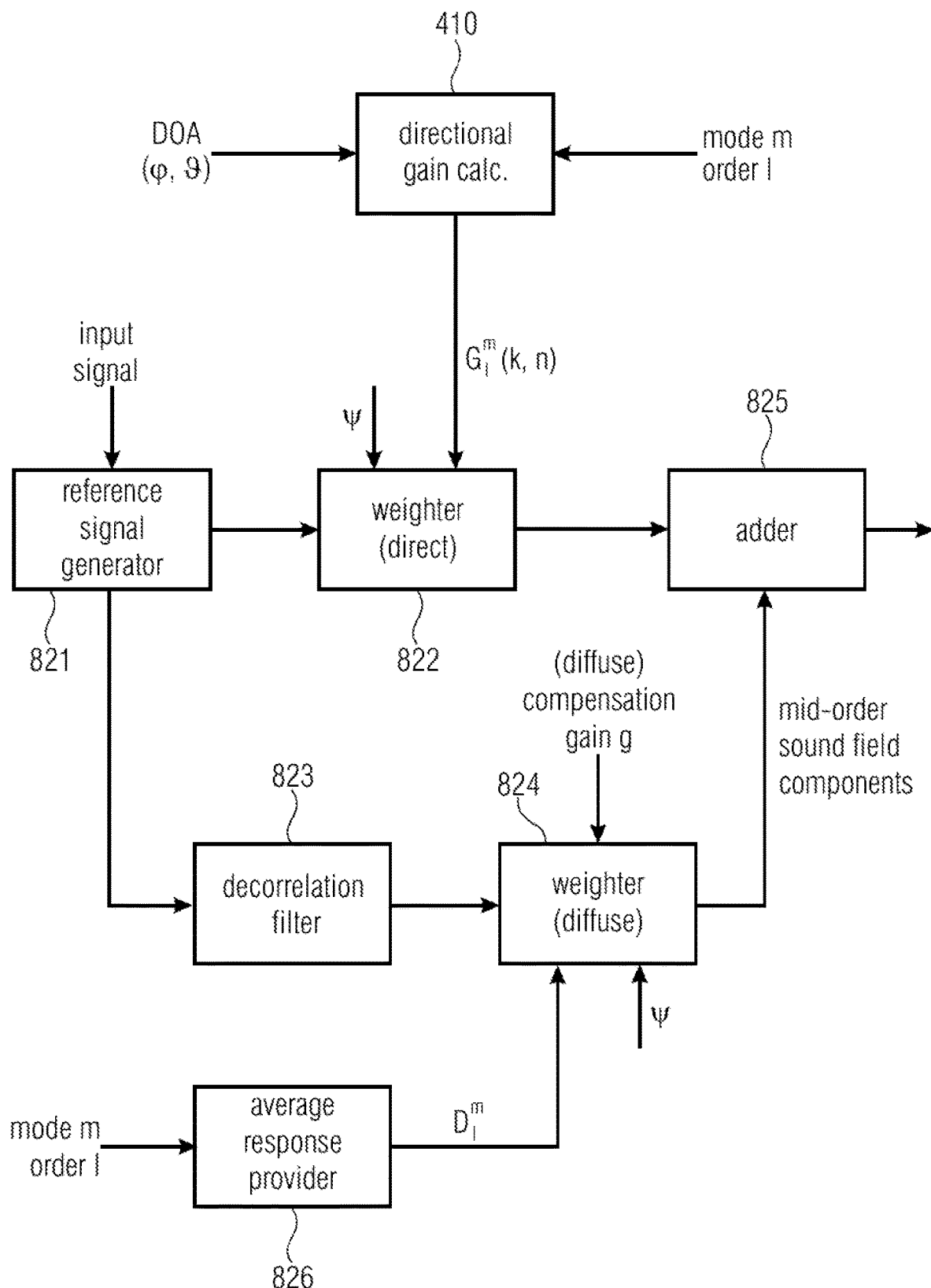
FIG. 10 illustrates an implementation of the mid-order components generator of FIG. 8.

FIG. 10 illustrates an implementation of the mid-order components generator 820 of FIG. 8 or a part of the sound component generator 650 for the direct/diffuse lower arrow of block 650 relating to the first group. In particular, the mid-order components generator 820 comprises the reference signal generator 821 that receives the input signal and generates the reference signal by copying or taking as it is when the input signal is a mono signal or by deriving the reference signal from the input signal by calculation as discussed before or as illustrated in WO 2017/157803 A1 incorporated herein by reference with its entire teaching.

Furthermore, FIG. 10 illustrates the directional gain calculator 410 that is configured to calculate, from the certain DOA information ($\phi$, $\theta$) and from a certain mode number m and a certain order number I the directional gain $G_I^m$. In the embodiment, where the processing is done in the time/frequency domain for each individual tile referenced by k, n, the directional gain is calculated for each such time/frequency tile. The weighter 820 receives the reference signal and the diffuseness data for the certain time/frequency tile and the result of the weighter 820 is the direct portion. The diffuse portion is generated by the processing performed by the decorrelation filter 823 and the subsequent weighter 824 receiving the diffuseness value $\Psi$ for the certain time frame and the frequency bin and, in particular, receiving the average response to a certain mode m and order I indicated by $D_I$ generated by the average response provider 826 that receives, as an input, the needed mode m and the needed order I.

The result of the weighter 824 is the diffuse portion and the diffuse portion is added to the direct portion by the adder 825 in order to obtain a certain mid-order sound field component for a certain mode m and a certain order I. It is advantageous to apply the diffuse compensation gain discussed with respect to FIG. 6 only to the diffuse portion generated by block 823. This can advantageously be done within the procedure done by the (diffuse) weighter. Thus, only the diffuse portion in the signal is enhanced in order to compensate for the loss of diffuse energy incurred by higher components that do not receive a full synthesis as illustrated in FIG. 10.

Figure 11:
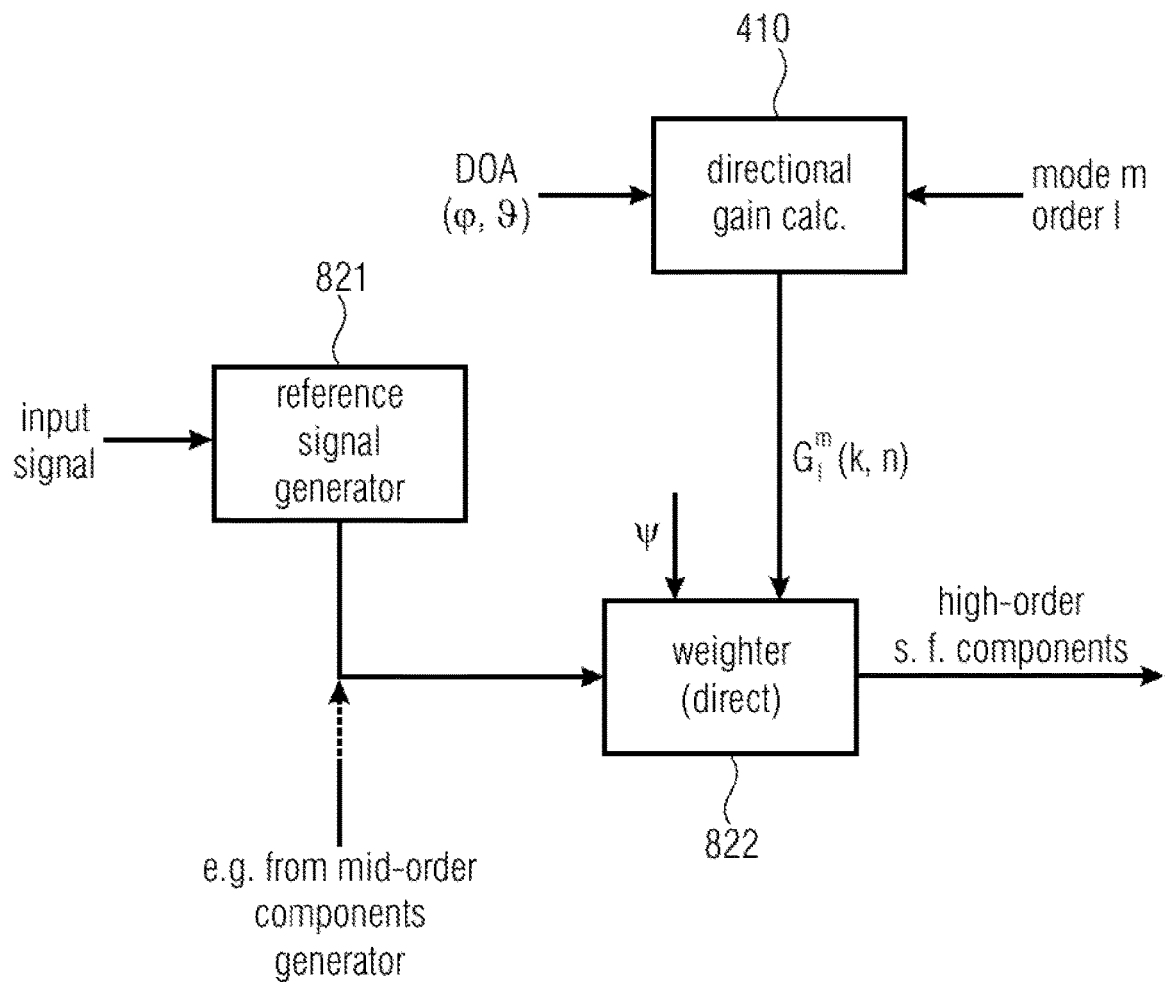
FIG. 11 illustrates an implementation of the high-order components generator of FIG. 8.

A direct portion only generation is illustrated in FIG. 11 for the high-order components generator. Basically, the high-order components generator is implemented in the same way as the mid-order components generator with respect to the direct branch but does not comprise blocks 823, 824, 825 and 826. Thus, the high-order components generator only comprises the (direct) weighter 822 receiving input data from the directional gain calculator 410 and receiving a reference signal from the reference signal generator 821. Only a single reference signal for the high-order components generator and the mid-order components generator is generated. However, both blocks can also have individual reference signal generators as the case may be. Nevertheless, it is advantageous to only have a single reference signal generator. Thus, the processing performed by the high-order components generator is extremely efficient, since only a single weighting direction with a certain directional gain $G_l^m$ with a certain diffuseness information W for the time/frequency tile is to be performed. Thus, the high-order sound field components can be generated extremely efficiently and promptly and any error due to a non-generation of diffuse components or non-usage of diffuse components in the output signal is easily compensated for by enhancing the low-order sound field components or the only diffuse portion of the mid-order sound field components.

Typically, the diffuse portion will not be available separately within the low-order sound field components generated by copying or by performing a (weighted) linear combination. However, enhancing the energy of such components automatically enhances the energy of the diffuse portion. The concurrent enhancement of the energy of the direct portion is not problematic as has been found out by the inventors.

Subsequently reference is made to FIGS. 12a to 12c in order to further illustrate the calculation of the individual compensation gains.

Figure 12A:
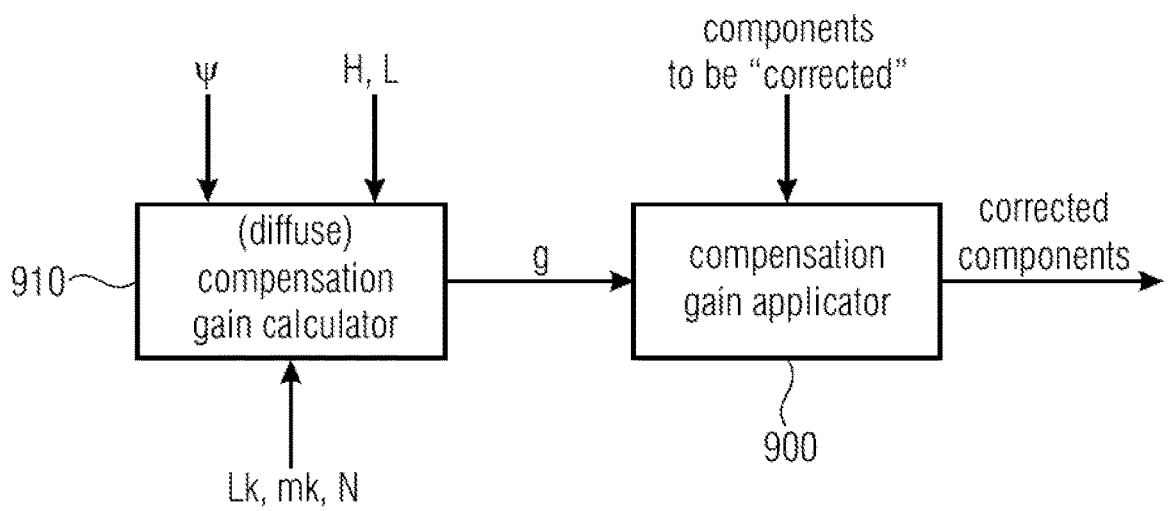
FIG. 12a illustrates an implementation of the compensation gain calculation in accordance with the first aspect.

FIG. 12a illustrates an implementation of the sound component generator 650 of FIG. 6. The (diffuse) compensation gain is calculated, in one embodiment, using the diffuseness value, the maximum order H and the truncation order L. In the other embodiment, the diffuse compensation gain is calculated using the parameter $L_k$ derived from the number of components in the low-order processing branch 810.

Furthermore, the parameter mk is used depending on the parameter Ik and the number K of components actually generated by the low-order component generator. Furthermore, the value N depending on $L_k$ is used as well. Both values H, L in the first embodiment or H, Lk, mk generally represent the number of sound field components in the second group (related to the number of sound components in the first group). Thus, the more components there are for which no diffuse component is synthesized, the higher the energy compensation gain will be. On the other hand, the higher the number of low-order sound field components there are, which can be compensated for, i.e., multiplied by the gain factor, the lower the gain factor can be. Generally, the gain factor g will be greater than 1.

FIG. 12a illustrates the calculation of the gain factor g by the (diffuse) compensation gain calculator 910 and the subsequent application of this gain factor to the (low-order) component to be "corrected" as done by the compensation gain applicator 900. In case of linear numbers, the compensation gain applicator will be a multiplier, and in case of logarithmic numbers, the compensation gain applicator will be an adder. However, other implementations of the compensation gain application can be implemented depending on the specific nature and way of calculating the compensation gain by block 910. Thus, the gain does not necessarily have to be a multiplicative gain but can also be any other gain.

Figure 12B:
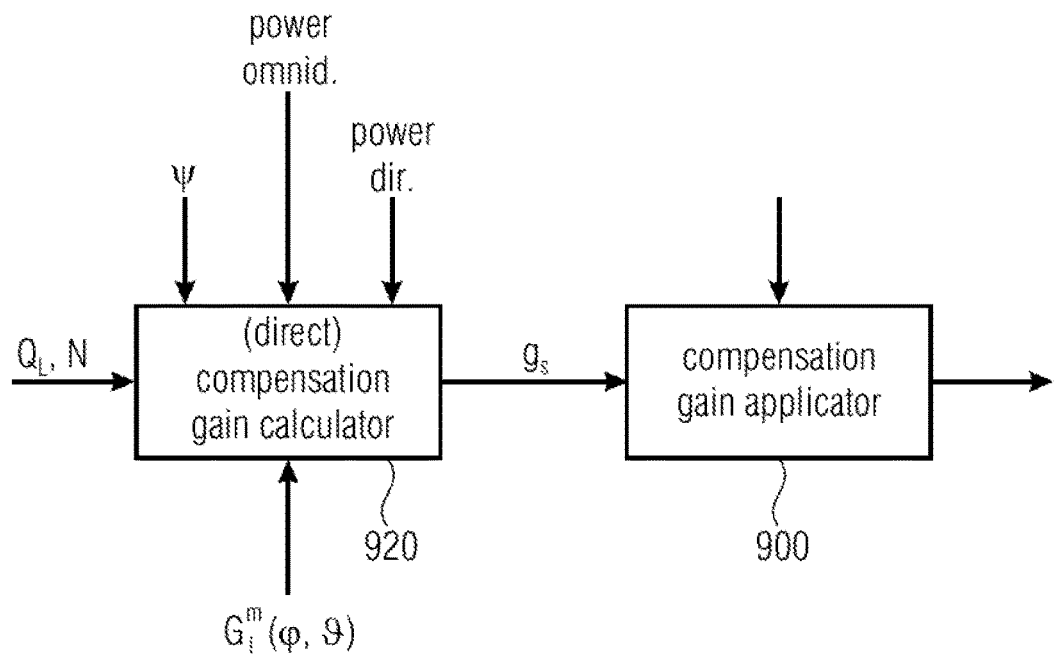
FIG. 12b illustrates an implementation of the energy compensation calculation in accordance with the second aspect.

FIG. 12b illustrates a third implementation for the (direct) compensation gain processing. A (direct) compensation gain calculator 920 receives, as an input, the energy- or amplitude-related measure for the omnidirectional component indicated as "power omnidirectional" in FIG. 12b. Furthermore, the second energy- or amplitude-related measure for the directional component is also input into block 920 as "power directional". Furthermore, the direct compensation gain calculator 920 additionally receives the information $Q_L$ or, alternatively, the information N. N is equal to (2l+1) being the number of coefficients per order l, and $Q_l$ is equal to 1/N. furthermore, the directional gain $G_l^m$ for the certain time/frequency tile (k, n) is also needed for the calculation of the (direct) compensation gain. The directional gain is the same data which is derived from the directional gain calculator 410 of FIG. 4, for example. The (direct) compensation gain $g_s$ is forwarded from block 920 to the compensation gain applicator 900 that can be implemented in a similar way as block 900, i.e., receives the component(s) to be "corrected" and outputs the corrected component(s).

Figure 12C:
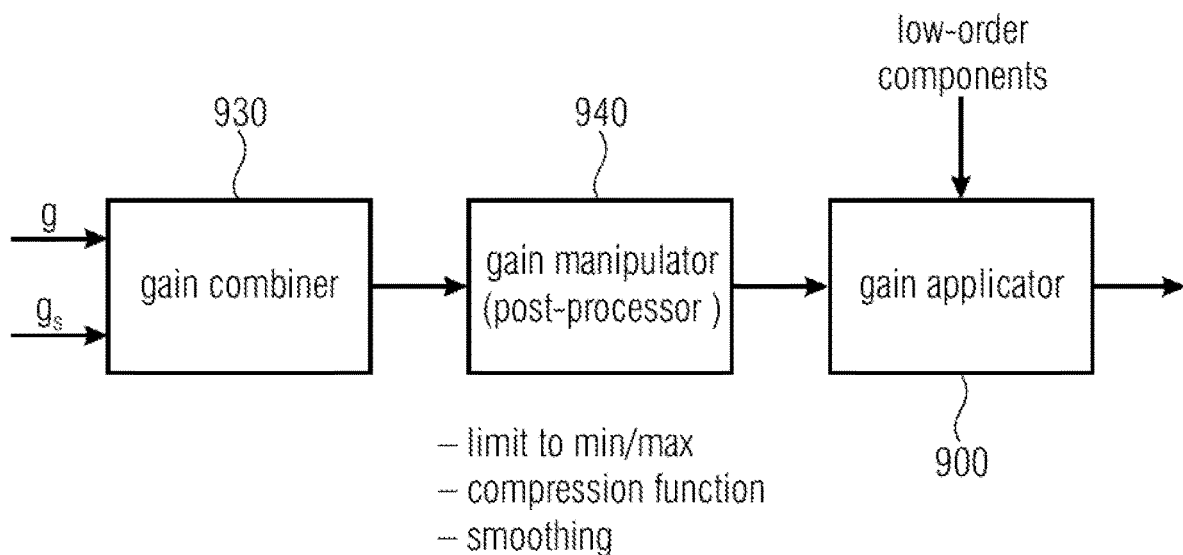
FIG. 12c illustrates an implementation of the energy compensation combining the first aspect and the second aspect.

FIG. 12c illustrates an implementation of the combination of the energy compensation of the diffuse sound components and the energy normalization of compensation of direct sound components to be performed jointly. To this end, the (diffuse) compensation gain g and the (direct) compensation gain $g_s$ are input into a gain combiner 930. The result of the gain combiner (i.e., the combined gain) is input into a gain manipulator 940 that is implemented as a post-processor and performs a limitation to a minimum or a maximum value or that applies a compression function in order to perform some kind of softer limitation or performs a smoothing among time or frequency tiles. The manipulated gain which is limited is compressed or smoothed or processed in other post-processing ways and the post-processed gain is then applied by the gain applicator to a low-order component(s) to obtain corrected low-order component(s).

In case of linear gains g, $g_s$, the gain combiner 930 is implemented as a multiplier. In case of logarithmic gains, the gain combiner is implemented as an adder. Furthermore, regarding the implementation of the estimator of FIG. 7 indicated at reference number 620, it is outlined that the estimator 620 can provide any energy- or amplitude-related measures for the omnidirectional and the directional component as long as the power applied to the amplitude is greater than 1. In case of a power as the energy- or amplitude-related measure, the exponent is equal to 2. However, exponents between 1.5 and 2.5 are useful as well. Furthermore, even higher exponents or powers are useful such as a power of 3 applied to the amplitude corresponding to a loudness value rather than a power value. Thus, in general, powers of 2 or 3 are advantageous for providing the energy- or amplitude-related measures but powers between 1.5 and 4 are generally advantageous as well.

Subsequently several examples for the aspects of the invention are summarized.

Main Example 1a for the First Aspect (Energy Compensation for the Diffuse Sound Components)

1a. Apparatus for generating a sound field description from an input signal comprising one or more channels, the apparatus comprising:

an input signal analyzer for obtaining diffuseness data from the input signal;

a sound component generator for generating, from the input signal, one or more sound field components of a first group of sound field components having for each sound field component a direct component and a diffuse component, and for generating, from the input signal, a second group of sound field components having only a direct component, wherein the sound component generator is configured to perform an energy compensation when generating the first group of sound field components, the energy compensation depending on the diffuseness data and a number of sound field components in the second group.

Main Example 1 b for the Second Aspect (Energy Normalization for the Direct Signal Components)

1b. Apparatus for generating a sound field description from an input signal comprising at least two channels, the apparatus comprising:

an input signal analyzer for obtaining direction data and diffuseness data from the input signal;

an estimator for estimating a first amplitude-related measure for an omnidirectional component derived from the input signal and for estimating a second amplitude-related measure for a directional component derived from the input signal, and a sound component generator for generating sound field components of the sound field, wherein the sound component generator is configured to perform an energy compensation of the directional component using the first amplitude-related measure, the second amplitude-related measure, the direction data and the diffuseness data.

Main Example 1 c for the Third Aspect: System Implementation with Different Generator Branches 1c. Apparatus for generating a sound field description using an input signal comprising a mono-signal or a multi-channel signal, the apparatus comprising:

an input signal analyzer for analyzing the input signal to derive direction data and diffuseness data;

a low-order components generator for generating a low-order sound description from the input signal up to a predetermined order and mode, wherein the low-order components generator is configured to derive the low-order sound description by copying the input signal or performing a weighted combination of the channels of the input signal;

a mid-order components generator for generating a mid-order sound description above the predetermined order or at the predetermined order and above the predetermined mode and below or at a first truncation order using a synthesis of at least one direct portion and of at least one diffuse portion using the direction data and the diffuseness data so that the mid-order sound description comprises a direct contribution and a diffuse contribution; and a high-order components generator for generating a high-order sound description having a component above the first truncation order using a synthesis of at least one direct portion without any diffuse component synthesis so that the high order sound description comprises a direct contribution only.

2. The apparatus according to examples 1a, 1b, 1c, wherein the low-order sound description, the mid-order sound description or the high-order description contain sound field components of the output sound field which are orthogonal, so that any two sound descriptions do not contain one and the same sound field components, or wherein the mid-order components generator generates components below or at a first truncation order not used by the low-order components generator.

3. Apparatus of one of the preceding examples, comprising:

receiving an input down-mix signal having one or more audio channels that represent the sound field receiving or determining one or more sound directions that represent the sound field;

evaluating one or more spatial basis functions using the one and more sound directions;

deriving a first set of one or more sound field components from a first weighted combination of input down-mix signal channels.

deriving a second set of one or more direct sound field components from a second weighted combination of input down-mix signal channels and the one and more evaluated spatial basis functions.

combining the first set of one or more sound field components and second set of one or more sound field components.

4. Apparatus of one of the preceding examples, where the first and second sets of sound field components are orthogonal.

5. Apparatus of one of the preceding examples, where the sound field components are the coefficients of orthogonal basis functions.

6. Apparatus of one of the preceding examples, where the sound field components are the coefficients of spatial basis functions.

7. Apparatus of one of the preceding examples, where the sound field components are the coefficients of spherical or circular harmonics.

8. Apparatus of one of the preceding examples, where the sound field components are Ambisonics coefficients.

9. Apparatus of one of the preceding examples, where the input down-mix signal have less than three audio channels.

10. Apparatus of one of the preceding examples, further comprising:

receiving or determining a diffuseness value;

generating one or more diffuse sound components as a function of the diffuseness value; and combining the one or more diffuse sound components to a second set of one or more direct sound field components;

11. Apparatus of one of the preceding examples, wherein a diffuse component generator further comprises a decorrelator for decorrelating diffuse sound information.

12. Apparatus of one of the preceding examples, wherein the first set of one or more sound field components are derived from the diffuseness value.

13. Apparatus of one of the preceding examples, wherein the first set of one or more sound field components are derived from the one or more sound directions.

14. Apparatus of one of the preceding examples that derives time-frequency dependent sound directions.

15. Apparatus of one of the preceding examples that derives time-frequency dependent diffuseness values.

16. Apparatus of one of the preceding examples, further comprising: decomposing the plurality of channels of the time-domain down-mix signal into a frequency representation having the plurality of time-frequency tiles.

17. Method for generating a sound field description from an input signal comprising one or more channels, comprising:
obtaining diffuseness data from the input signal;
generating, from the input signal, one or more sound field components of a first group of sound field components having for each sound field component a direct component and a diffuse component, and for generating, from the input signal, a second group of sound field components having only a direct component,
wherein the generating comprises performing an energy compensation when generating the first group of sound field components, the energy compensation depending on the diffuseness data and a number of sound field components in the second group.

18. Method for generating a sound field description from an input signal comprising at least two channels, comprising:
obtaining direction data and diffuseness data from the input signal;
estimating a first amplitude-related measure for an omnidirectional component derived from the input signal and for estimating a second amplitude-related measure for a directional component derived from the input signal, and
generating sound field components of the sound field, wherein the sound component generator is configured to perform an energy compensation of the directional component using the first amplitude-related measure, the second amplitude-related measure, the direction data and the diffuseness data.

19. Method for generating a sound field description using an input signal comprising a mono-signal or a multi-channel signal, comprising:
analyzing the input signal to derive direction data and diffuseness data;
generating a low order sound description from the input signal up to a predetermined order and mode, wherein the low order generator is configured to derive the low order sound description by copying the input signal or performing a weighted combination of the channels of the input signal;
generating a mid-order sound description above the predetermined order or at the predetermined order and above the predetermined mode and below a high order using a synthesis of at least one direct portion and of at least one diffuse portion using the direction data and the diffuseness data so that the mid-order sound description comprises a direct contribution and a diffuse contribution; and
generating a high order sound description having a component at or above the high order using a synthesis of at least one direct portion without any diffuse component synthesis so that the high order sound description comprises a direct contribution only.

20. Computer program for performing, when running on a computer or a processor, the method of one of examples 17, 18, or 19.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The following publications are incorporated herein by reference:

[1] V. Pulkki, M-V Laitinen, J Vilkamo, J Ahonen, T Lokki and T Pihlajamäki, "Directional audio coding-perception-based reproduction of spatial sound", International Workshop on the Principles and Application on Spatial Hearing, November 2009, Zao; Miyagi, Japan.

[2] M. V. Laitinen and V. Pulkki, "Converting 5.1 audio recordings to B-format for directional audio coding reproduction," 2011 IEEE International Conference on Acoustics, Speech and Signal Processing (ICASSP), Prague, 2011, pp. 61-64

[3] R. K. Furness, "Ambisonics—An overview," in AES 8th International Conference, April 1990, pp. 181-189.

[4] C. Nachbar, F. Zotter, E. Deleflie, and A. Sontacchi, "AMBIX—A Suggested Ambisonics Format", Proceedings of the Ambisonics Symposium 2011

[5] "APPARATUS, METHOD OR COMPUTER PROGRAM FOR GENERATING A SOUND FIELD DESCRIPTION" (corresponding to WO 2017/157803 A1) As in the diffuseness compensation case

The invention claimed is:

1. Apparatus for generating a sound field description using an input signal comprising a mono-signal or a multi-channel signal, the apparatus comprising:
an input signal analyzer for analyzing the input signal to derive direction data and diffuseness data;
a low-order components generator for generating a low-order sound field description from the input signal up to a predetermined order and mode, wherein the low-order components generator is configured to derive the low-order sound field description by copying or taking the input signal or performing a weighted combination of the channels of the input signal;
a mid-order components generator for generating a mid-order sound field description above the predetermined order or at the predetermined order and above the predetermined mode and below or at a high order using a synthesis of at least one direct portion and of at least one diffuse portion using the direction data and the diffuseness data so that the mid-order sound field description comprises a direct contribution and a diffuse contribution; and
a high-order components generator for generating a high-order sound field description comprising a component above the high order using a synthesis of at least one direct portion, wherein the high-order sound field description comprises a direct contribution only,
wherein the low-order components generator is configured to generate K low-order sound field components, with K being 1 or greater than 1 and depending on the predetermined order and the predetermined mode, wherein the mid-order components generator is configured to generate $(L+1)^2-K$ mid-order sound field components, L being greater than K and depending on the high order, and wherein the high-order components generator is configured to generate $(H+1)^2-(L+1)^2$ high-order sound field components, wherein H is an integer greater than L and wherein H represents a maximum order of the generated sound field description, or wherein the mid-order components generator comprises: a reference signal generator for providing a reference signal for a sound field component of the mid-order sound field description and for modifying the reference signal using the directional data; a decorrelator for decorrelating the reference signal or a signal derived from the reference signal to acquire a decorrelated signal; and a mixer for mixing the modified reference signal and the decorrelated signal using the diffuseness data, or wherein the low-order components generator is configured to perform an energy compensation to a directional component comprised in the input signal or derived from the input signal by copying, taking or performing a weighted combination, and wherein the low-order components generator comprises: an estimator for estimating a first energy- or amplitude-related measure for an omnidirectional component derived from the input signal and for estimating a second energy- or amplitude-related measure for a directional component derived from the input signal; and wherein the low-order components generator is configured to perform an energy compensation of the directional component using the first energy- or amplitude-related measure, the second energy- or amplitude-related measure, the direction data and the diffuseness data, or wherein the low-order components generator is configured to perform an energy compensation to a directional component comprised in the input signal or derived from the input signal by copying, taking or performing a weighted combination, wherein the low-order components generator comprises an energy compensator for performing the energy compensation, the energy compensator comprising a compensation gain calculator for calculating a compensation gain using the diffuseness data, a maximum order of the sound field components of a first group and a maximum order of the sound field components of a second group, wherein the maximum order of the sound field components of the second group depends of the number of sound field components in the second group.

2. Apparatus of claim 1, wherein the input signal analyzer is configured to extract the diffuseness data from metadata associated with the input signal or to extract the diffuseness data from the input signal by a signal analysis of the input signal comprising two or more channels or components.

3. Apparatus for generating a sound field description using an input signal comprising a mono-signal or a multi-channel signal, the apparatus comprising:
an input signal analyzer for analyzing the input signal to derive direction data and diffuseness data;
a low-order components generator for generating a low-order sound field description from the input signal up to a predetermined order and mode, wherein the low-order components generator is configured to derive the low-order sound field description by copying or taking the input signal or performing a weighted combination of the channels of the input signal;
a mid-order components generator for generating a mid-order sound field description above the predetermined order or at the predetermined order and above the predetermined mode and below or at a high order using a synthesis of at least one direct portion and of at least one diffuse portion using the direction data and the diffuseness data so that the mid-order sound field description comprises a direct contribution and a diffuse contribution; and a high-order components generator for generating a high-order sound field description comprising a component above the high order using a synthesis of at least one direct portion, wherein the high-order sound field description comprises a direct contribution only, wherein the apparatus further comprises a sound field combiner for combining low-order sound field components of the low-order sound field description, mid-order sound field components of the mid-order sound field description and high-order sound field components of the high-order sound field description to obtain a combined sound field having $(H+1)^2$ sound field components, wherein H is a maximum order of the generated sound field description, or wherein the apparatus further comprises a directional gains calculator for calculating directional gains for mid-order sound field components of the mid-order sound field description and high-order sound field components of the high-order sound field description from the direction data and/or the diffuseness data and for feeding the directional gains for the mid-order sound field components to the mid-order components generator and for feeding the directional gains for the high-order sound field components to the high-order components generator, or wherein the high-order components generator is configured to only synthesize a direct portion for a sound field component of the high-order sound field description using the direction data, and wherein the apparatus further comprises a directional gain calculator for the sound field component of the high-order sound field description configured for evaluating a spatial basis function for an order and a mode of the component of the high-order sound field description, wherein the high-order components generator is configured to derive the sound field component from a reference signal and the directional gain.

4. Apparatus of claim 3, wherein the directional gains calculator is configured
to receive, for each time-frequency tile of a plurality of time-frequency tiles, the directional data and/or the diffuseness data, and
to evaluate a spatial basis function for a certain order and mode using the directional data to obtain the directional gain for the certain order and mode.

5. Apparatus of claim 1,
wherein the input signal comprises the mono signal, and wherein the low-order components generator is configured to generate a zero order Ambisonics signal by taking or copying the mono signal, or
wherein the input signal comprises at least two channels, and wherein the low-order components generator is configured to generate a zero order Ambisonics signal by adding the two channels and to generate a first order Ambisonics signal based on a difference of the two channels, or
wherein the input signal comprises a first order Ambisonics signal with three or four channels, and wherein the low-order components generator is configured to generate a first order Ambisonics signal by taking or copying the three or four channels of the input signal, or
wherein the input signal comprises an A-format signal comprising four channels, and wherein the low-order components generator is configured to calculate a first order Ambisonics signal by performing a weighted linear combination of the four channels.

6. Apparatus of claim 1, wherein the high-order components generator is configured to only synthesize a direct portion for a sound field component of the high-order sound field description using the direction data.

7. Apparatus of claim 3, wherein the high-order components generator is configured to multiply the reference signal by the directional gain for the order and mode of the sound field component and to multiply by a factor derived from the diffuseness data to acquire the sound field component of the high-order sound field description.

8. Apparatus of claim 1,
wherein the decorrelator comprises a decorrelation filter for receiving the reference signal and for outputting a filtered reference signal, and
wherein the decorrelator is configured to weight the filtered signal or a signal input into the decorrelation filter by a weighting value derived from the diffuseness data and by a further weighting value derived from an order and mode of the sound field component under consideration to acquire the diffuse portion, and
wherein the mixer is configured to add the direct portion and the diffuse portion of the same order and mode to acquire the mid-order sound field component.

9. Apparatus of claim 1,
wherein the low-order components generator is configured to perform an energy compensation to one or more sound field components of the low-order sound field description to compensate for an energy loss due to the high-order sound field description only comprising the direct component, or
wherein the mid-order components generator is configured to perform an energy compensation to the at least one diffuse portion of the mid-order sound field description or to a sound field component of the mid-order sound field description to compensate for an energy loss due to the high-order sound field description only comprising the direct component,
wherein the energy compensation depends on the diffuseness data and at least one of a number of sound field components generated by the high-order components generator, a number of diffuse components generated by the low-order components generator and/or the mid-order components generator, a maximum order of sound field components generated by the low-order components generator and/or the mid-order components generator and a maximum order of sound field components generated by the high-order components generator.

10. Apparatus of claim 1, wherein the low-order components generator is configured to perform an energy compensation to a directional component comprised in the input signal or derived from the input signal by copying, taking or performing a weighted combination.

11. Apparatus of claim 1, wherein the high-order components generator is configured to multiply the reference signal by the directional gain for the order and mode of the sound field component and to multiply by a factor derived from the diffuseness data to acquire the sound field component of the high-order sound field description.

12. Apparatus of claim 1,
wherein the energy compensator comprises a compensation gain applicator for applying the compensation gain to at least one sound field component.

13. Apparatus of claim 1,
wherein a first group of sound field components and a second group of sound field components are orthogonal to each other, or wherein the sound field components are at least one of coefficients of orthogonal basis functions, coefficients of spatial basis functions, coefficients of spherical or circular harmonics, and Ambisonics coefficients.

14. Apparatus of claim 1 further comprising:
an analysis filter bank for generating the one or more sound field components of a first group and a second group for a plurality of different time-frequency tiles,
wherein the input signal analyzer is configured to acquire a direction data item and a diffuseness data item for each time-frequency tile, and
wherein the low-order components generator, the mid-order components generator, or the high-order components generator is configured to operate separately for each time-frequency tile.

15. Method for generating a sound field description using an input signal comprising a mono-signal or a multi-channel signal, comprising:
analyzing the input signal to derive direction data and diffuseness data;
generating a low-order sound field description from the input signal up to a predetermined order and mode, wherein the generating the low-order sound field description comprises deriving the low-order sound field description by copying the input signal or performing a weighted combination of the channels of the input signal;
generating a mid-order sound field description above the predetermined order or at the predetermined order and above the predetermined mode and below a high order using a synthesis of at least one direct portion and of at least one diffuse portion using the direction data and the diffuseness data so that the mid-order sound field description comprises a direct contribution and a diffuse contribution; and
generating a high-order sound field description comprising a component at or above the high order using a synthesis of at least one direct portion without any diffuse component synthesis so that the high-order sound field description comprises a direct contribution only,
wherein the generating the low-order sound field description comprises generating K low-order sound field components, with K being 1 or greater than 1 and depending on the predetermined order and the predetermined mode, wherein the generating the mid-order sound field description comprises generating $(L+1)^2-K$ mid-order sound field components, L being greater than K and depending on the high order, and wherein the generating the high-order sound field description comprises generating $(H+1)^2-(L+1)^2$ high-order sound field components, wherein H is an integer greater than L and wherein H represents a maximum order of the generated sound field description, or
wherein the generating the mid-order sound field description comprises: providing a reference signal for a sound field component of the mid-order sound field description and modifying the reference signal using the directional data; decorrelating the reference signal or a signal derived from the reference signal to acquire a decorrelated signal; and mixing the modified reference signal and the decorrelated signal using the diffuseness data, or
wherein the generating the low-order sound field description comprises estimating a first energy- or amplitude-related measure for an omnidirectional component derived from the input signal, estimating a second energy- or amplitude-related measure for a directional component derived from the input signal, and performing an energy compensation of the directional component comprised in the input signal or derived from the input signal by copying, taking or performing a weighted combination using the first energy- or amplitude-related measure, the second energy- or amplitude-related measure, the direction data and the diffuseness data, or
wherein the generating the low-order sound field description comprises performing an energy compensation to a directional component comprised in the input signal or derived from the input signal by copying, taking or performing a weighted combination, using a compensation gain, wherein the compensation gain is calculated using the diffuseness data, a maximum order of the sound field components of a first group and a maximum order of the sound field components of a second group, wherein the maximum order of the sound field components of the second group depends of the number of sound field components in the second group.

16. A non-transitory digital storage medium having a computer program stored thereon to perform, when said computer program is run by a computer, the method for generating a sound field description using an input signal comprising a mono-signal or a multi-channel signal, the method comprising:
analyzing the input signal to derive direction data and diffuseness data;
generating a low-order sound field description from the input signal up to a predetermined order and mode, wherein the generating the low-order sound field description comprises deriving the low-order sound field description by copying the input signal or performing a weighted combination of the channels of the input signal;
generating a mid-order sound field description above the predetermined order or at the predetermined order and above the predetermined mode and below a high order using a synthesis of at least one direct portion and of at least one diffuse portion using the direction data and the diffuseness data so that the mid-order sound field description comprises a direct contribution and a diffuse contribution; and
generating a high-order sound field description comprising a component at or above the high order using a synthesis of at least one direct portion without any diffuse component synthesis so that the high-order sound field description comprises a direct contribution only,
wherein the generating the low-order sound field description comprises generating K low-order sound field components, with K being 1 or greater than 1 and depending on the predetermined order and the predetermined mode, wherein the generating the mid-order sound field description comprises generating $(L+1)^2-K$ mid-order sound field components, L being greater than K and depending on the high order, and wherein the generating the high-order sound field description comprises generating $(H+1)^2-(L+1)^2$ high-order sound field components, wherein H is an integer greater than L and wherein H represents a maximum order of the generated sound field description, or wherein the generating the mid-order sound field description comprises: providing a reference signal for a sound field component of the mid-order sound field description and modifying the reference signal using the directional data; decorrelating the reference signal or a signal derived from the reference signal to acquire a decorrelated signal; and mixing the modified reference signal and the decorrelated signal using the diffuseness data, or wherein the generating the low-order sound field description comprises estimating a first energy- or amplitude-related measure for an omnidirectional component derived from the input signal, estimating a second energy- or amplitude-related measure for a directional component derived from the input signal, and performing an energy compensation of the directional component comprised in the input signal or derived from the input signal by copying, taking or performing a weighted combination using the first energy- or amplitude-related measure, the second energy- or amplitude-related measure, the direction data and the diffuseness data, or wherein the generating the low-order sound field description comprises performing an energy compensation to a directional component comprised in the input signal or derived from the input signal by copying, taking or performing a weighted combination, using a compensation gain, wherein the compensation gain is calculated using the diffuseness data, a maximum order of the sound field components of a first group and a maximum order of the sound field components of a second group, wherein the maximum order of the sound field components of the second group depends of the number of sound field components in the second group.

17. Method for generating a sound field description using an input signal comprising a mono-signal or a multi-channel signal, comprising:

analyzing the input signal to derive direction data and diffuseness data;

generating a low-order sound field description from the input signal up to a predetermined order and mode, wherein the generating the low-order sound field description comprises deriving the low-order sound field description by copying the input signal or performing a weighted combination of the channels of the input signal;

generating a mid-order sound field description above the predetermined order or at the predetermined order and above the predetermined mode and below a high order using a synthesis of at least one direct portion and of at least one diffuse portion using the direction data and the diffuseness data so that the mid-order sound field description comprises a direct contribution and a diffuse contribution; and generating a high-order sound field description comprising a component at or above the high order using a synthesis of at least one direct portion without any diffuse component synthesis so that the high-order sound field description comprises a direct contribution only, wherein the method further comprises combining low-order sound field components of the low-order sound field description, mid-order sound field components of the mid-order sound field description and high-order sound field components of the high-order sound field description to obtain a combined sound field having $(H+1)^2$ sound field components, wherein H is a maximum order of the generated sound field description, or wherein the method further comprises calculating directional gains for mid-order sound field components of the mid-order sound field description and high-order sound field components of the high-order sound field description from the direction data and/or the diffuseness data and feeding the directional gains for the mid-order sound field components to the generating the mid-order sound field description step and feeding the directional gains for the high-order sound field components to the generating the high-order sound field description step, or wherein the generating the high-order sound field description comprises only synthesizing a direct portion for a sound field component of the high-order sound field description using the direction data, and wherein the method further comprises evaluating a spatial basis function for an order and a mode of the component of the high-order sound field description, wherein the generating the high-order sound field description comprises deriving the sound field component from a reference signal and the directional gain.

18. A non-transitory digital storage medium having a computer program stored thereon to perform, when said computer program is run by a computer, the method for generating a sound field description using an input signal comprising a mono-signal or a multi-channel signal, the method comprising:

analyzing the input signal to derive direction data and diffuseness data;

generating a low-order sound field description from the input signal up to a predetermined order and mode, wherein the generating the low-order sound field description comprises deriving the low-order sound field description by copying the input signal or performing a weighted combination of the channels of the input signal;

generating a mid-order sound field description above the predetermined order or at the predetermined order and above the predetermined mode and below a high order using a synthesis of at least one direct portion and of at least one diffuse portion using the direction data and the diffuseness data so that the mid-order sound field description comprises a direct contribution and a diffuse contribution; and generating a high-order sound field description comprising a component at or above the high order using a synthesis of at least one direct portion without any diffuse component synthesis so that the high-order sound field description comprises a direct contribution only, wherein the method further comprises combining low-order sound field components of the low-order sound field description, mid-order sound field components of the mid-order sound field description and high-order sound field components of the high-order sound field description to obtain a combined sound field having $(H+1)^2$ sound field components, wherein H is a maximum order of the generated sound field description, or wherein the method further comprises calculating directional gains for mid-order sound field components of the mid-order sound field description and high-order sound field components of the high-order sound field description from the direction data and/or the diffuseness data and feeding the directional gains for the mid-order sound field components to the generating the mid-order sound field description step and feeding the directional gains for the high-order sound field components to the generating the high-order sound field description step, or wherein the generating the high-order sound field description comprises only synthesizing a direct portion for a sound field component of the high-order sound field description using the direction data, and wherein the method further comprises evaluating a spatial basis function for an order and a mode of the component of the high-order sound field description, wherein the generating the high-order sound field description comprises deriving the sound field component from a reference signal and the directional gain.

\* \* \* \* \*